US006829392B2

(12) United States Patent
Aoki

(10) Patent No.: US 6,829,392 B2
(45) Date of Patent: Dec. 7, 2004

(54) SYSTEM AND METHOD FOR PROVIDING AN IMAGE DEGHOSTING CIRCUIT IN AN ELECTROPTIC DISPLAY DEVICE

(75) Inventor: Toru Aoki, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 531 days.

(21) Appl. No.: 09/938,657

(22) Filed: Aug. 27, 2001

(65) Prior Publication Data

US 2002/0041263 A1 Apr. 11, 2002

(30) Foreign Application Priority Data

Aug. 28, 2000 (JP) ....................................... 2000-257888
Jul. 12, 2001 (JP) ....................................... 2001-212084

(51) Int. Cl.[7] ................................................. G06T 5/50

(52) U.S. Cl. ......................... 382/275; 345/87; 345/204; 348/614; 348/790; 352/160

(58) Field of Search ........................... 345/87–104, 204; 348/614, 618–620, 700–701, 790–792; 352/160; 382/274–275

(56) References Cited

U.S. PATENT DOCUMENTS

| | | | | | |
|---|---|---|---|---|---|
| 5,208,673 | A | * 5/1993 | Boyce | 348/701 |
| 5,253,063 | A | * 10/1993 | Ebihara et al. | 348/614 |
| 5,719,643 | A | * 2/1998 | Nakajima | 348/700 |
| 6,011,533 | A | * 1/2000 | Aoki | 345/92 |
| 6,122,016 | A | * 9/2000 | De Haan et al. | 348/620 |
| 6,177,915 | B1 | * 1/2001 | Beeteson et al. | 345/87 |
| 6,329,980 | B1 | * 12/2001 | Uehara et al. | 345/204 |
| 6,753,840 | B2 | * 6/2004 | Aoki | 345/98 |

FOREIGN PATENT DOCUMENTS

| | | |
|---|---|---|
| JP | 09-016127 | 1/1997 |
| JP | 09-269754 | 10/1997 |
| JP | 2000-098981 | 4/2000 |
| JP | 2001-337641 | 12/2001 |

* cited by examiner

*Primary Examiner*—Leo Boudreau
*Assistant Examiner*—Patrick L. Edwards
(74) *Attorney, Agent, or Firm*—Oliff & Berridge, PLC

(57) ABSTRACT

The present invention provides an image processing circuit for use in an electrooptic device having a plurality of scanning lines, a plurality of data lines, switching elements which are respectively disposed in correspondence with intersections between the scanning lines and the data lines, and pixel electrodes which are electrically coupled to the corresponding switching elements. The image processing circuit includes a delay circuit that delays externally supplied image data by a unit time so as to output delayed image data, first correction-data generation circuit that generates correction data on the basis of data which has been obtained by averaging a difference between the image data and the delayed image data every unit time, second correction-data generation circuit that generates second correction data on the basis of data which has been obtained by averaging a difference between the image data and predetermined reference data every unit time, correction circuit that generates corrected image data by correcting the delayed image data on the basis of the first correction data and the second correction data, and a phase expansion circuit which divides the corrected image data into a plurality of phase-expanded video signals and which feeds the phase-expanded video signals to the plurality of data lines. Thus, block ghosting can be cancelled in a case where an image is displayed by successively selecting blocks in each of which a plurality of data lines are collected.

15 Claims, 13 Drawing Sheets

SYSTEM AND METHOD FOR PROVIDING AN IMAGE DEGHOSTING CIRCUIT IN AN ELECTROPTIC DISPLAY DEVICE

BACKGROUND OF THE INVENTION

1. Field of Invention

The present invention relates to an image processing circuit as well as an image data processing method suited for application to an electrooptic device, wherein video signals obtained by dividing a video signal into a plurality of channels and extending the time axis thereof, so as to maintain a predetermined signal level every unit time, are fed to corresponding data lines at a predetermined timing. Also, it relates to an electrooptic device and electronic equipment which employ such a processing circuit or method.

2. Description of Related Art

A conventional electrooptic device, for example, an active matrix-type liquid-crystal display device, will be explained with reference to FIGS. 11 and 12. First, as shown in FIG. 11, the conventional liquid-crystal display device is constructed of a liquid-crystal display panel 100, a timing circuit 200, and a video signal processing circuit 300. The timing circuit 200 outputs timing signals for use in various portions. The video signal processing circuit 300 can include a D/A converter circuit 301 that converts image data Da supplied by external equipment from a digital signal into an analog signal and outputs the resulting signal as a video signal VID. Further, a phase expansion circuit 302 can be included that expands the received video signal VID of one channel into video signals of N phases (N=6 in the figure) and outputs the resulting video signals. Here, the video signal is expanded into N phases by a sampling circuit so that a time period for which the video signal fed to thin film transistors (TFTs) is applied is lengthened, thereby sufficiently securing a sampling time period for the data signals and a charge/discharge time period for the TFT panel 100 for the data signals.

In turn, an amplifier/inverter circuit 303 subjects the video signals to polarity inversion under the following conditions and amplifies the inverted signals as required, so as to feed phase-expanded video signals VID1–VID6 to the liquid-crystal display panel 100. Here, "polarity inversion" signifies alternately inverting the voltage levels of the video signals with respect to a reference potential set at the center potential of the amplitudes of the video signals. Besides, the inversion of the video signals is done when the method of applying the data signal is (1) polarity inversion in scanning line units, (2) polarity inversion in data signal line units, or (3) polarity inversion in pixel units, and the inversion period is set at one horizontal scanning period or one dot clock period.

The liquid-crystal display panel 100 can be constructed so that an element substrate and a counter substrate are opposed to each other with a gap defined therebetween, and a liquid crystal is enclosed in the gap. Here, each of the element substrate and the counter substrate can be made of a quartz substrate, a hard glass, or the like.

In the element substrate, a plurality of scanning lines 112 are arrayed and formed in parallel so as to extend in the X-direction in FIG. 12, while a plurality of data lines 114 are formed in parallel so as to extend in the Y-direction orthogonal to the scanning lines 112. Here, the data lines 114 are divided into blocks each consisting of six lines, and the blocks are termed "blocks B1-Bm". For brevity of the ensuing explanation, when referring to the data lines in general, they will be designated by the reference numeral 114, but when referring to specified ones of the data lines 114, they will be designated by reference numerals 114*a*–114*f*.

At the intersection points between the scanning lines 112 and the data lines 114, TFTs 116 are connected as switching elements, by way of example. More specifically, the gate electrodes of the TFTs 116 are connected to the scanning lines 112, while the source electrodes thereof are connected to the data lines 114, and the drain electrodes thereof are connected to pixel electrodes 118. Individual pixels are configured of the pixel electrodes 118, a common electrode formed on the counter substrate, and the liquid crystal sandwiched in between both the electrodes, and they are arrayed in the shape of a matrix at the intersection points between the scanning lines 112 and the data lines 114. Incidentally, retention capacitors (not shown) are further formed in a state where they are respectively connected to the pixel electrodes 118.

Meanwhile, a scanning line driver circuit 120 can be formed on the element substrate, and the scanning line driver circuit 120 outputs pulse-like scanning signals to the respective scanning lines 112 in succession on the basis of a clock signal CLY, the inverted clock signal CLYinv thereof, a transfer start pulse DY, etc. delivered from the timing circuit 200. More specifically, the scanning line driver circuit 120 successively shifts the transfer start pulse DY fed at the beginning of a vertical scanning period in accordance with the clock signal CLY and the inverted clock signal CLYinv, and it outputs the resulting signals as scanning line signals, to thereby successively select the respective scanning lines 112.

On the other hand, a sampling circuit 130 includes a sampling switch 131 at one end of each of the data lines 114. The switches 131 can be made of TFTs which are also formed on the element substrate, and the source electrodes of these switches 131 are fed with the corresponding video signals VID1–VID6 through video signal feed lines L1–L6. Besides, the gate electrodes of the six switches 131 connected to the data lines 114*a*–114*f* of the block B1 are connected to a signal line which is fed with a sampling signal S1, and those of the six switches 131 connected to the data lines 114*a*–114*f* of the block B2 are connected to a signal line which is fed with a sampling signal S2. Likewise, the gate electrodes of the six switches 131 connected to the data lines 114*a*–114*f* of the block Bm are connected to a signal line which is fed with a sampling signal Sm. Here, each of the sampling signals S1-Sm is a signal for sampling the video signals VID1–VID6 every block within a horizontal effective display period.

A shift register circuit 140 is also formed on the element substrate, and the shift register 140 outputs the sampling signals S1-Sm in succession on the basis of a clock signal CLX, the inverted clock signal CLXinv thereof, a transfer start pulse DX, etc. delivered from the timing circuit 200. More specifically, the shift register circuit 140 successively shifts the transfer start pulse DX fed at the beginning of the horizontal scanning period in accordance with the clock signal CLX and the inverted clock signal CLXinv, and it successively outputs the resulting signals as the sampling signals S1-Sm.

In such a construction, when the sampling signal S1 is outputted, the video signals VID1–VID6 are respectively sampled by the six data lines 114*a*–114*f* belonging to the block B1, and they are respectively written into the six pixels associated with the selected scanning lines at the current time by the corresponding TFTs 116.

Thereafter, when the sampling signal S2 is outputted, the video signals VID1–VID6 are respectively sampled by the six data lines 114*a*–114*f* belonging to the block B2, on this occasion, and they are respectively written into the six pixels associated with the selected scanning lines at that time by the corresponding TFTs 116.

Likewise, when the sampling signals S3, S4, . . . and Sm are successively outputted, the video signals VID1–VID6 are respectively sampled by the six data lines 114*a*–114*f* belonging to the blocks B3, B4, . . . and Bm, and they are respectively written into the six pixels associated with the selected scanning lines at those times. Then, the next scanning lines are subsequently selected, and similar write operations are repeatedly executed in the blocks B1-Bm.

With the above driving system, the number of stages of the shift register circuit 140 for driving and controlling the switches 131 in the sampling circuit 130 is reduced to ⅙ as compared with the number of stages in a system in which the respective data lines are driven in point sequence. Moreover, the frequencies of the clock signal CLX and the inverted clock signal CLXinv to be fed to the shift register circuit 140 may be as small as ⅙, so that a lower power dissipation can be attained along with a reduction in the number of stages.

However, in the system in which a video signal of one channel is subjected to phase expansion into a plurality of channels so as to drive a liquid-crystal display panel by employing multi-channel video signals, there can be a problem in that gradations to be displayed deviating from the desired ones are displayed in block units (hereinbelow, the phenomenon shall be termed "block ghost").

By way of example, consider a liquid-crystal display panel which operates in a normally-white mode, and one screen of which is constituted by blocks B1–B7, as shown in FIG. 13A. It is assumed that black is displayed in the blocks B1–B3 and in the area b41 of the block B4, as shown in FIG. 13B, while a gray level is displayed in the area b42 of the block B4 and in the blocks B5, B6 and B7. Then, the area b42 becomes somewhat brighter than the gray level, and the following block B5 becomes somewhat darker than the gray level.

As a result of repeated experiments and studies on such block ghosts, it has been found that the major factors of the block ghost are the two factors stated below.

In the liquid-crystal display panel 100 shown in FIG. 12, an equivalent circuit concerning the i-th block Bi is as shown in FIG. 14. Referring to FIG. 14, letter R indicates the equivalent resistance of the counter electrode (common electrode). Since the liquid crystal is sandwiched between the video signal feed lines L1–L6 and the counter electrode, parasitic capacitances appear. Reference characters Cxa–Cxf denote the parasitic capacitances as equivalent capacitances. Further, reference characters 131*a*–131*f* denote the sampling switches 131 which correspond to the respective video signal feed lines L1–L6. In addition, reference characters Cya–Cyf denote the parasitic capacitances of the data lines 114*a*–114*f* (chiefly appearing between these data lines and the counter electrode) and the capacitances of pixel capacitors as equivalent capacitances.

The first factor consists in the point that differentiator circuits are formed by the equivalent capacitances Cxa–Cxf and the resistance R, so when the video signals VID1–VID6 are inputted to the liquid-crystal display panel 100, a waveform corresponding to the magnitude of the voltage changes of the video signals VID1–VID6 is generated on the counter electrode.

The second factor is that voltage change of the counter electrode is due to charging/discharging in the case where the block Bi is selected. More specifically, when the block Bi is selected to turn ON the switches 131*a*–131*f*, the equivalent capacitances Cya–Cyf are charged/discharged from an initial voltage Vs (the voltage at the nodes between the equivalent capacitances Cya–Cyf and the switches 113*a*–113*f* at the start of the selection time period of the block Bi) to the voltages of the video signals VID1–VID6. The second factor results from a differential waveform being generated on the counter electrode by charging/discharging currents on this occasion.

The voltage distortions of the differential waveforms caused by the first and second factors appear at the start of the selection time period of the block Bi, and attenuate over time. Letting Ve denote an error voltage which remains on the counter electrode at the end of the selection time period of the block Bi, non-uniformity in display occurs unless Ve is set to zero. The reason is that the switches 113*a*–113*f* are turned OFF at the end of the selection time period, so voltages affected by the error voltage Ve are held in the pixel capacitors.

A first error voltage Ve1 attributable to the first factor is given by the following equation (1), where α denotes a constant, and $V_{k,i}$ denotes the video signal which is to be fed to the k-th data line in the i-th block:

$$Ve1 = \alpha\sum_{k=1}^{6}(V_{k,t} - V_{k,i-1}) \tag{1}$$

A second error voltage Ve2 attributable to the second factor is given by the following equation (2), where β denotes a constant:

$$Ve2 = \beta\sum_{k=1}^{6}(V_{k,1} - Vs) \tag{2}$$

Accordingly, the error voltage Ve which is the total of the error voltages Ve1 and Ve2 is given by the following equation (3):

$$Ve = \alpha\sum_{k=1}^{6}(V_{k,i} - V_{k,i-1}) + \beta\sum_{k=1}^{6}(V_{k,i} - Vs) \tag{3}$$

Using equations (1)–(3), luminance changes in the blocks B3 to B5 shown in FIG. 13B will be studied. Here, as shown in FIG. 13B, it is assumed that a black level Vb is fed to the four left-hand data lines (in the area b41) among the six data lines 114*a*–114*f* constituting the block B4, that a gray level Vc is fed to the two right-hand data lines (in the area b42), and that the initial voltage Vs agrees with the gray level Vc.

First, consider the change of the luminance level of the block B3 at I=3. As shown in FIG. 13A, the block B2 directly preceding the block B3 displays black similarly to the block B3. Therefore, both the terms $V_{k,i}$ and $V_{k,i-1}$ in equation (1) become the black level Vb, and Ve1=0 holds. Since the initial voltage Vs agrees with the gray level Vc, Ve2=6β(Vb−Vc)>0 holds. Accordingly, the error voltage Ve becomes positive, and the block B3 brightens. Human vision, however, cannot substantially detect a luminance change for black though it can detect even a slight luminance change for a gray level. Therefore, a person would hardly notice that the block B3 has become brighter.

Secondly, regarding the block B4, black is displayed in the ⅔ area b41, and a gray level is displayed in the remaining ⅓ area b42. Therefore, Ve1=−2α(Vb−Vc)<0 and Ve2=4β(Vb−Vc)>0 hold. Whether the error voltage Ve takes a positive value or a negative value, depends upon the values of the constants α and β. In general, the values of the equivalent capacitances Cya–Cyf are greater than those of the equivalent capacitances Cxa–Cxf, so that β>α holds in many cases. Accordingly, the error voltage Ve usually becomes positive, and the entire block B4 brightens. Owing to the visual characteristic stated above, however, a person can detect that the area b42 displaying the gray level has brightened, though they hardly notices that the luminance of the area b41 displaying black has increased.

Thirdly, since the gray level is displayed in the block B5, $Ve1=-4\alpha(Vb-Vc)<0$ and $Ve2=0$ hold, and the error voltage Ve takes a negative value. Therefore, the block B5 darkens.

SUMMARY OF THE INVENTION

The present invention has been made in view of the above circumstances, and has one object to strongly enhance the display quality in such a way that, in a case where a gray level to be displayed changes midway in a block, block ghosting in the remaining area (for example, b42) of the pertinent block and in the next block (for example, B5) are cancelled.

In order to accomplish the object, an image processing circuit according to a first aspect of the present invention is an image processing circuit for use in an electrooptic device having a plurality of scanning lines, a plurality of data lines, switching elements which are respectively disposed in correspondence with intersections between the scanning lines and the data lines, and pixel electrodes which are electrically connected to the corresponding switching elements. The image processing circuit can include a delay circuit which delays externally supplied image data by a unit time so as to output delayed image data, a first correction-data generation circuit for generating first correction data on the basis of data which has been obtained by averaging a difference between the image data and the delayed image data every unit time, a second correction-data generation circuit for generating second correction data on the basis of data which has been obtained by averaging a difference between the image data and predetermined reference data every unit time, a correction circuit for generating corrected image data by correcting the delayed image data on the basis of the first correction data and the second correction data, and a phase expansion circuit which divides the corrected image data into a plurality of phase-expanded video signals and which feeds the phase-expanded video signals to the plurality of data lines.

In the electrooptic device to which the invention is applied, an image is displayed on the basis of phase-expanded video signals divided into a plurality of channels. In this regard, parasitic capacitances occur in video signal feed lines which lead to the corresponding data lines. Further, parasitic capacitances also occur in the data lines themselves, and pixel capacitors are disposed. Moreover, a distributed resistance exists in a counter electrode. Therefore, differentiator circuits are equivalently formed between the video signal feed lines and the counter electrode, while differentiator circuits are equivalently formed between the data lines and the counter electrode. Accordingly, when the signal level of a video signal which is fed to the electrooptic device changes, a first error voltage is induced in the counter electrode by the differentiator circuit formed between the video signal feed line and the counter electrode. Moreover, when a certain one of the data lines is selected, charging/discharging takes place, so that the second error voltage of the counter electrode changes. Ghosting can be caused by these factors.

According to the first aspect of present invention, the first correction-data generation circuit can average the first difference data every unit time, thereby generating the first correction data, which corresponds to the first error voltage. The second correction-data generation means averages the second difference data every unit time, thereby generating the second correction data, which corresponds to the second error voltage. That is, the first and second correction data correspond to the voltage changes of the counter electrode as predicted. The corrected image data is generated by correcting the delayed image data on the basis of the first and second correction data, so that even when the first and second error voltages occur in the counter electrode, they can be cancelled by generating the video signals on the basis of the corrected image data. As a result, the block ghosting can be greatly reduced and the quality of a displayed image can be strongly enhanced.

In the first aspect of performance of the present invention, the first correction-data generation circuit can preferably include a first subtracter circuit which calculates the difference between the image data and the delayed image data as first difference data, a first averaging circuit which generates first average data obtained by averaging the first difference data every unit time, and a first coefficient circuit which generates the first correction data by multiplying the first average data by a first coefficient.

The first averaging circuit may preferably include an accumulator circuit which accumulates the first difference data every unit time, and a divider circuit which divides the accumulated result by the number of phase-expanded video signals.

In the first aspect of the present invention, the second correction-data generation circuit can include a second subtracter circuit which calculates the difference between the image data and the reference data as second difference data, a second averaging circuit which generates second average data obtained by averaging the second difference data every unit time, and a second coefficient circuit which generates the second correction data by multiplying the second average data by a second coefficient.

The second averaging circuit can include an accumulator circuit which accumulates the second difference data every unit time, and a divider circuit which divides a result of the accumulation by the number of phase-expanded video signals.

Accordingly, the accumulated results are divided by the number of the divided video signals (the number of the phase-expanded video signals), so that the first and second difference data averaged in each block can be calculated.

Preferably, the reference data corresponds to an initial voltage which is applied to pixel capacitors including the pixel electrodes, a counter electrode held opposite to the pixel electrodes, and an electrooptic material.

Alternatively, the reference data may be a precharge voltage which is applied to pixel capacitors including the pixel electrodes, a counter electrode held in opposition to the pixel electrodes, and an electrooptic material.

Since the second error voltage described above is due to the charging/discharging, the changes of the voltages of the data lines and the pixel capacitors become problematic. Therefore, the initial voltage or the precharge voltage can be employed as the reference data. In the actual electrooptic device, however, the optimum value of the reference data can deviate from the initial or precharge voltage on account of various factors, and hence, the reference data may be essentially set so as to visually minimize the block ghosting.

The electrooptic device can further include a plurality of switching elements which sample the respective phase-expanded video signals in accordance with sampling signals and which feed them to the corresponding data lines, and video signal feed lines which feed the respective video signals to the corresponding switching elements. The first coefficient of the first coefficient circuit may preferably be determined on the basis of, at least, parasitic capacitance components due to the respective video signal feed lines and a resistance component of a counter electrode held opposite to the pixel electrodes. Thus, the ghosting attributable to the first error voltage can be effectively cancelled.

The second coefficient of the second coefficient circuit may preferably be determined on the basis of, at least, parasitic capacitance components due to the respective data lines and a resistance component of a counter electrode held opposite to the pixel electrodes. Thus, the ghosting attributable to the second error voltage can be effectively cancelled.

An image processing circuit according to a second aspect of the present invention can include a delay circuit which delays externally supplied image data by a unit time so as to output delayed image data, a first correction-data generation circuit that generates first correction data on the basis of data which has been obtained by averaging a difference between the image data and the delayed image data every unit time, a second correction-data generation circuit that generates second correction data on the basis of data which has been obtained by averaging a difference between the image data and predetermined reference data every unit time and a correction circuit that generates corrected image data by correcting the delayed image data on the basis of the first correction data and the second correction data.

According to the second aspect of the present invention, the first correction-data generation circuit averages the first difference data every unit time, thereby generating the first correction data, which corresponds to a first error voltage. The second correction-data generation circuit averages the second difference data every unit time, thereby generating the second correction data, which corresponds to a second error voltage. That is, the first and second correction data correspond to the voltage changes of a counter electrode as predicted. The corrected image data is generated by correcting the delayed image data on the basis of the first and second correction data, so that even when the first and second error voltages occur in the counter electrode, they can be cancelled by generating video signals on the basis of the corrected image data. As a result, block ghosting can be substantially reduced and the quality of the displayed image can be strongly enhanced.

An electrooptic device according to a third aspect of the present invention can include a plurality of scanning lines, a plurality of data lines, switching elements which are respectively disposed in correspondence with intersections between the scanning lines and the data lines, pixel electrodes which are respectively electrically connected to the switching elements, and a delay circuit which delays externally supplied image data by a unit time so as to output delayed image data. The device can further include a first correction-data generation circuit for generating first correction data on the basis of data which has been obtained by averaging a difference between the image data and the delayed image data every unit time, a second correction-data generation circuit for generating second correction data on the basis of data which has been obtained by averaging a difference between the image data and predetermined reference data every unit time, a correction circuit for generating corrected image data by correcting the delayed image data on the basis of the first correction data and the second correction data, and a phase expansion circuit which divides the corrected image data into a plurality of phase-expanded video signals and which feeds the phase-expanded video signals to the plurality of data lines.

According to the electrooptic device, block ghosting can be substantially reduced and quality of the displayed image can be strongly enhanced.

Preferably, the above electrooptic device may further include a data line driver circuit which generates sampling signals in succession; and a sampling circuit which samples the phase-expanded video signals on the basis of the sampling signals and feeds the sampled signals to the corresponding data lines.

According to this electrooptic device, the quality of the display image can be strongly enhanced, and a time period for which the video signals are fed to the data lines can be lengthened.

Electronic equipment according to the present invention is characterized by including the electrooptic device described above, and includes, for example, a video projector, a notebook-type personal computer, and a mobile telephone.

A a first image data processing method according to a fourth aspect of the present invention is an image data processing method for use in an electrooptic device wherein video signals are fed to a plurality of data lines. The method includes the steps of generating delayed image data by delaying externally supplied image data by a unit time, generating a difference between the image data and the delayed image data as first difference data, generating first average data by averaging the first difference data every unit time, generating first correction data by multiplying the first average data by a first coefficient, generating a difference between the image data and predetermined reference data as second difference data, generating second average data by averaging the second difference data every unit time, generating second correction data by multiplying the second average data by a second coefficient, generating corrected image data by correcting the delayed image data on the basis of the first correction data and the second correction data, and dividing the corrected image data into the plurality of phase-expanded video signals, and then feeding said video signals to the plurality of data lines.

According to this image data processing method, the first correction data corresponds to a first error voltage, and the second correction data corresponds to a second error voltage, so that the first and second correction data correspond to the voltage changes of a counter electrode as predicted. The corrected image data is generated by correcting the delayed image data on the basis of the first and second correction data, so that even when the first and second error voltages occur in the counter electrode, they can be cancelled by generating the video signals on the basis of the corrected image data. As a result, block ghosting can be substantially reduced and the quality of the displayed image can be strongly enhanced.

An image data processing method according to a fifth aspect of the present invention can include the steps of generating delayed image data by delaying externally supplied image data by a unit time, generating a difference between the image data and the delayed image data as first difference data, generating first average data by averaging the first difference data every unit time, generating first correction data by multiplying the first average data by a first coefficient, generating a difference between the image data and predetermined reference data as second difference data, generating second average data by averaging the second difference data every unit time, generating second correction data by multiplying the second average data by a second coefficient, and generating corrected image data by correcting the delayed image data on the basis of the first correction data and the second correction data.

According to this image data processing method, block ghosting can be substantially reduced and the quality of the displayed image can be greatly enhanced.

BRIEF DESCRIPTION OF THE DRAWINGS

The invention is described in detail with reference to the following Figures, wherein like numerals reference like elements, and wherein.

DETAILED DESCRIPTION OF PREFERRED EMBODIMENTS

First, an active matrix-type liquid-crystal display device will be described as an example of an electrooptic device according to the present invention.

Figure 1:
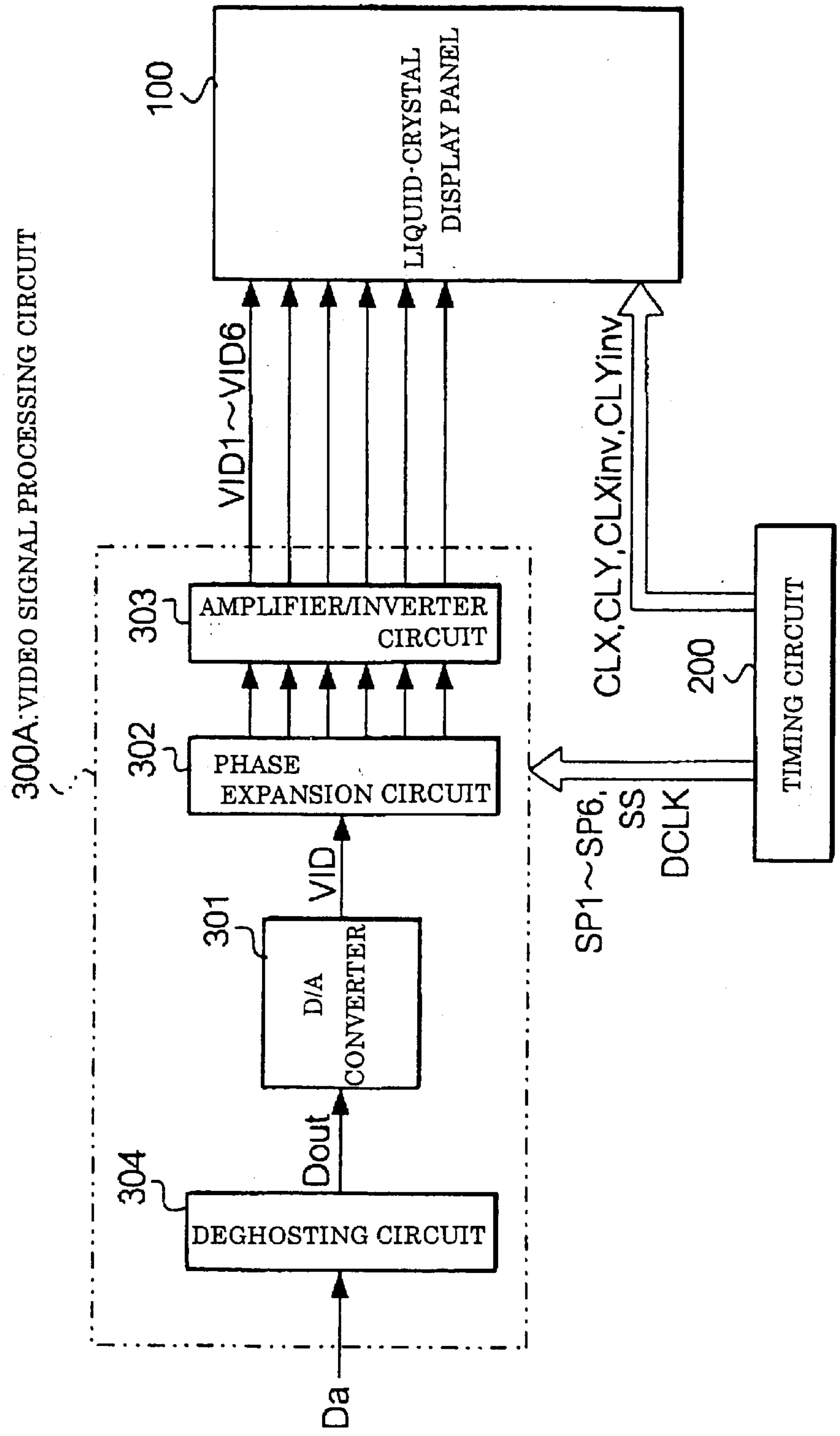
FIG. 1 is an exemplary block diagram showing the overall construction of a liquid-crystal display device in accordance with the present invention.
Figure 11:
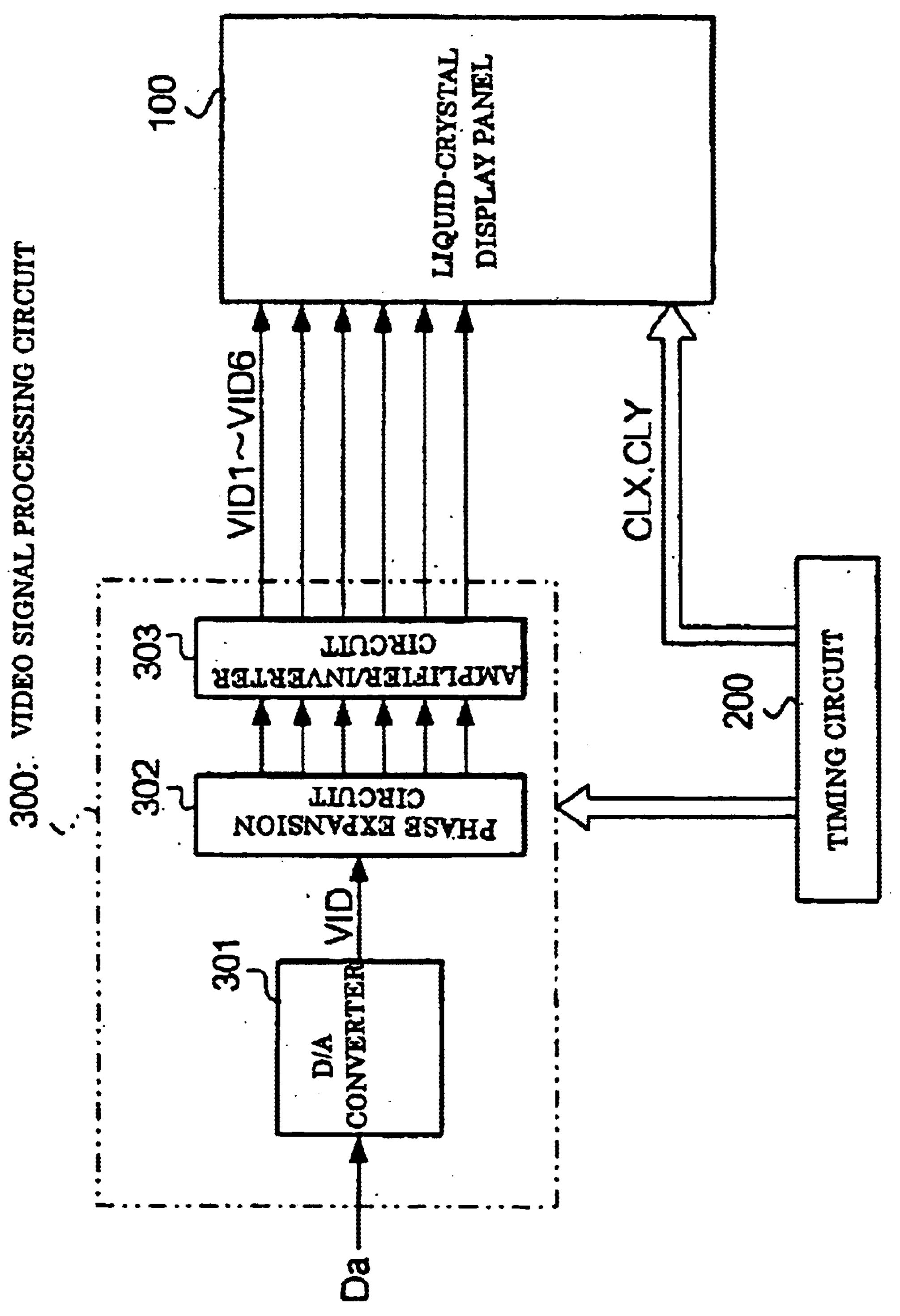
FIG. 11 (RELATED ART)
FIG. 11 is a block diagram showing the overall construction of a conventional liquid-crystal display device.

FIG. 1 is a block diagram showing the overall construction of the liquid-crystal display device. The liquid-crystal display device in this embodiment is constructed similarly to the conventional liquid-crystal display device shown in FIG. 11, except that, in a video signal processing circuit 300A, a deghosting circuit 304 is included at a stage preceding a D/A converter 301. The image data Da in this example can be a data string which has 8 bits in a parallel and whose sampling period is equal to the period of a dot clock signal DCLK, and it is supplied by external equipment (not shown).

The deghosting circuit 304 predicts block ghost components caused by the first and second factors explained above, and corrects the image data Da so as to cancel the predicted block ghost components, thereby generating corrected image data Dout.

A phase expansion circuit 302 subjects a video signal VID obtained by D/A-converting the corrected image data Dout, to serial-to-parallel conversion, thereby generating phase-expanded video signals VID1–VID6 expanded into six phases. More specifically, the phase expansion circuit 302 samples-and-holds the video signal VID on the basis of a sample-and-hold pulse SS and 6-phase sample-and-hold pulses SP1–SP6, which become active every six cycles of the dot clock signal DCLK, so as to extend the time axis of the video signal VID by a factor of six, and it divides the extended video signal into six channels, thereby generating the phase-expanded video signals VID1–VID6.

The phase-expanded video signals VID1–VID6 are generated on the basis of the video signal VID obtained by D/A-converting the corrected image data Dout in synchronization with the dot clock signal DCLK. Therefore, if the value of the original corrected image data Dout changes every dot clock cycle, the respective phase-expanded video signals VID1–VID6 change every six dot clock cycles. Accordingly, the phase-expanded video signals VID1–VID6 become signals which change with one unit time being a time period that is determined by the product between the number of expanded phases (the number of divided channels) and one cycle of the dot clock signal DCLK.

Figure 12:
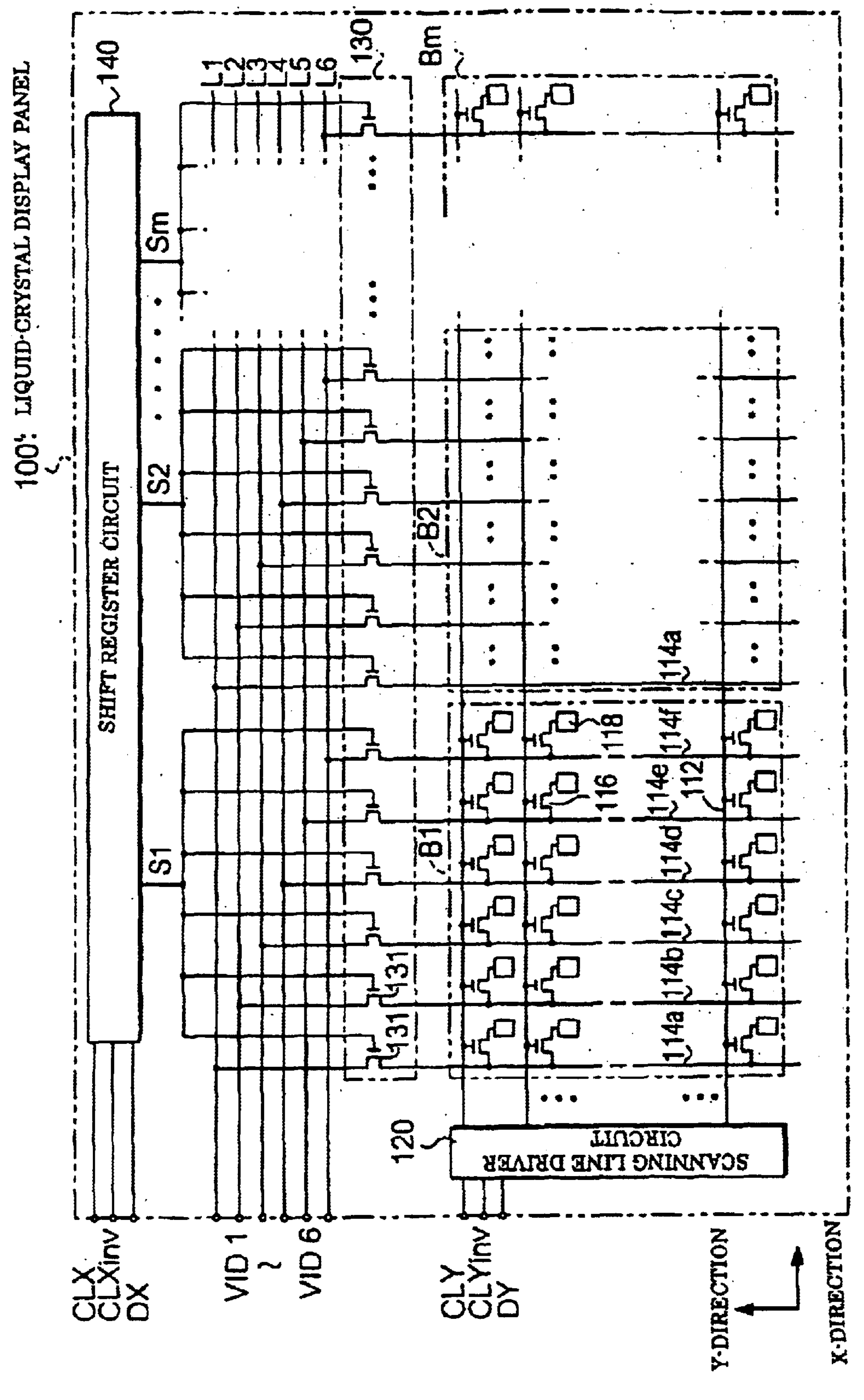
FIG. 12 (RELATED ART)
FIG. 12 is a connection diagram showing the electrical construction of a liquid-crystal display panel in the conventional liquid-crystal display device.

A liquid-crystal display panel 100 is the same as that employed in the conventional liquid-crystal display device shown in FIG. 12, and therefore a description is omitted here.

Figure 2:
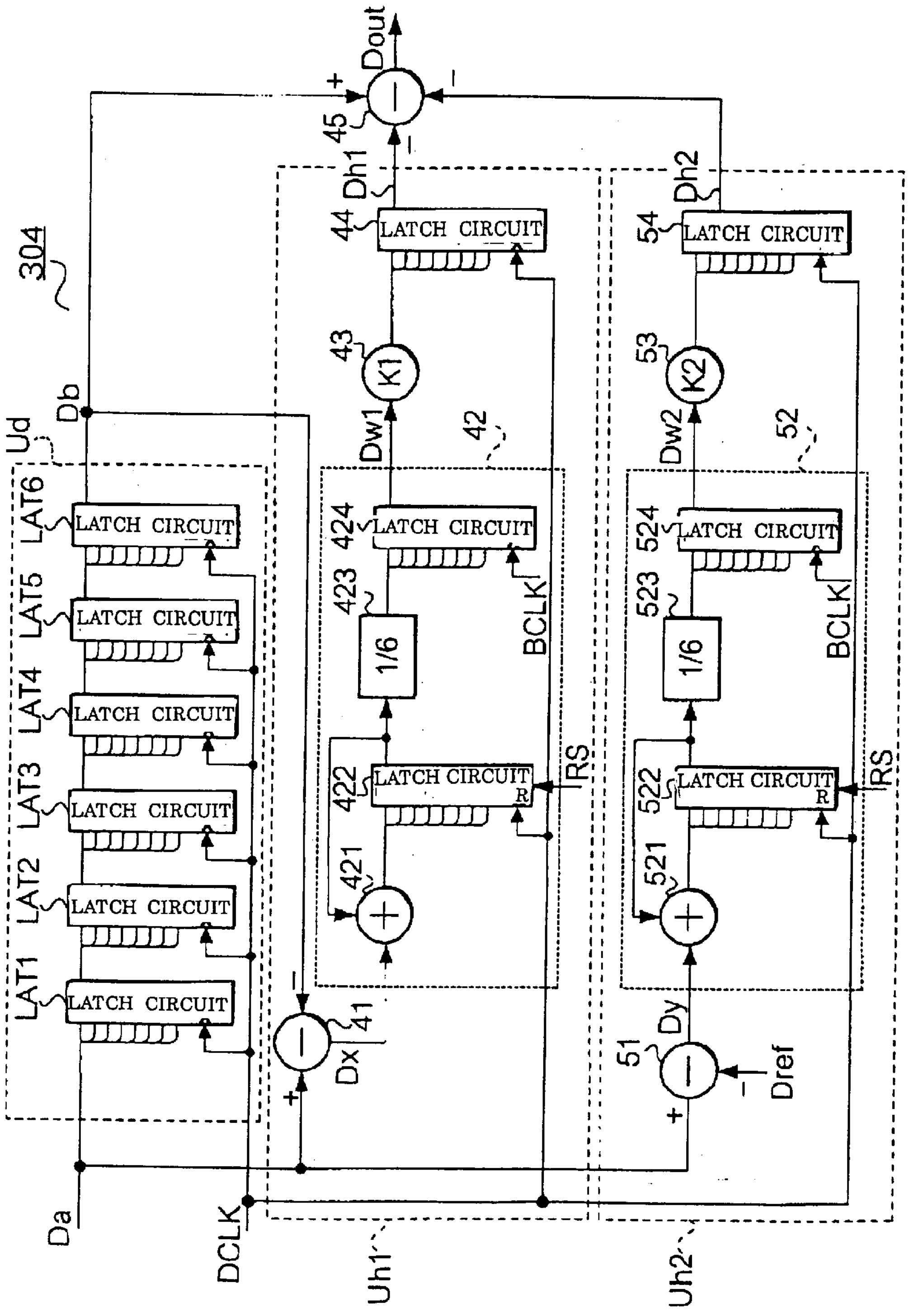
FIG. 2 is a block diagram showing the construction of a deghosting circuit in the liquid-crystal display device.

FIG. 2 is a detailed circuit diagram of the deghosting circuit 304. As shown, the deghosting circuit 304 is constructed of a delay unit Ud, a first correction unit Uh1, a second correction unit Uh2, and a subtracter circuit 45.

First, the delay unit Ud is constructed by connecting six latch circuits LAT1–LAT6 in series, and it delays the image data Da by a predetermined time period so as to output image data Db. Here, the latch circuits LAT1–LAT6 latch the 8-bit input data Da on the basis of the dot clock signal DCLK.

The dot clock signal DCLK is the master clock of the liquid-crystal display device, and is generated in the timing circuit 200. The timing circuit 200 divides the frequency of the dot clock signal DCLK so as to generate a clock signal CLX for driving the data line driver circuit of the liquid-crystal display panel 100, and a clock signal CLY for driving the scanning line driver circuit thereof. In this example, phase expansion into six phases is carried out in the phase expansion circuit 302. Therefore, the clock signal CLX is generated by dividing the frequency of the dot clock signal DCLK by 6.

Since the delay unit Ud is constructed of the series connection consisting of the six latch circuits LAT1–LAT6 which are driven by the dot clock signal DCLK, the image data Db becomes data delayed by six dot clock periods relative to the image data Da.

Meanwhile, as described above, the phase-expanded video signals VID1–VID6 change with one unit time being the time period which is determined by the product between the number of expanded phases (the number of channels into which the video signal VID is divided) and one period of the dot clock signal DCLK. In this example, one unit time becomes the six dot periods, which agree with the delay time of the delay unit Ud. In other words, the delay unit Ud generates the image data Db by delaying the image data Da for the time period which corresponds to one unit time of the phase-expanded video signals VID1–VID6 (the selection time period of a certain block) obtained by the phase expansion (serial-to-parallel conversion). Here, when the image data Da is current data, the image data Db is previous data one unit time before the current data one unit time.

Next, the first correction unit Uh1 includes a first subtracter circuit 41, a first averaging circuit 42, a first coefficient circuit 43, and a latch circuit 44, and it generates first correction data Dh1 corresponding to the first error voltage Ve1 explained before. The first subtracter circuit 41 subtracts the image data Db (previous) from the image data Da (current), thereby generating first difference data Dx.

Subsequently, the first averaging circuit 42 averages the first difference data Dx for each block, thereby generating first average data Dw1. The averaging circuit 42 has an adder circuit 421 and a latch circuit 422. The latch circuit 422 latches the output signal of the adder circuit 421 on the basis of the dot clock signal DCLK. The first difference data Dx is fed to one input terminal of the adder circuit 421, while the output data of the latch circuit 422 is fed back to the other input terminal thereof. Accordingly, the adder circuit 421 and the latch circuit 422 function as an accumulator circuit. A reset signal RS of six dot clock cycles is fed to the reset terminal R of the latch circuit 422. Therefore, the first difference data Dx is reset and is accumulated every unit time.

The first averaging circuit 42 further includes a divider circuit 423 and a latch circuit 424. The divider circuit 423 divides data obtained by accumulating the first difference data Dx in block units by "6" (the number of expanded phases). The latch circuit 424 latches the output data of the divider circuit 423 in accordance with a block clock signal BCLK which becomes active every unit time, and it outputs the latched data as the first average data Dw1. Incidentally, the block clock signal BCLK is generated by the timing circuit 200 shown in FIG. 1.

Subsequently, the first coefficient circuit 43 includes a multiplier unit, and first coefficient circuit 42 multiplies the first average data Dw1 by a first coefficient K1 and outputs the resulting product. The latch circuit 44 is used for time adjustment, and latch circuit yy latches the output data of the coefficient circuit 43 and outputs the latched data as the first correction data Dh1.

In this manner, in the first correction unit Uh1, the image data Db of the directly preceding block is subtracted from the image data Da of the current block, the subtracted result is integrated in block units, the integrated result is divided by the number of expanded phases (the number of divided channels), and the divided result is multiplied by the first coefficient K1, whereby the first correction data Dh1 is obtained. Accordingly, when K1/6=α is set, the first correction data Dh1 agrees with the first error voltage Ve1 explained before. Here, the first coefficient K1 should desirably be determined on the basis of, at least, the parasitic capacitance components occurring in the respective video signal feed lines L1–L6 and the resistance component of the counter electrode.

Next, the second correction unit Uh2 includes a second subtracter circuit 51, a second averaging circuit 52, a second coefficient circuit 53, and a latch circuit 54, and it generates second correction data Dh2 corresponding to the second error voltage Ve2 explained before.

The second subtracter circuit 51 subtracts predetermined reference data Dref from the image data Da, thereby generating second difference data Dy. Here, the reference data Dref can be experimentally determined so as to minimize the block ghosting.

As the reference data Dref, it is desirable to select the initial voltage Vs which was written to and held in the pixel capacitors of the pixels belonging to a certain block when the block was selected. The reason for this is that, as explained before, the second factor arises when the initial voltages Vs of the pixel capacitors change, to the voltages of the video signals VID1–VID6.

Meanwhile, the liquid-crystal display panel 100 is driven by an A.C. drive method so as not to apply a D.C. voltage to the liquid crystal. Therefore, at a certain pixel, the polarity of a voltage which is applied to the liquid crystal needs to be inverted with respect to the voltage of the counter electrode as a center voltage between even-numbered fields and odd-numbered fields. An image has a high correlation between the fields, so that when black is displayed in the even-numbered field for the certain pixel, it is often displayed in the succeeding odd-numbered field. In this case, the voltage which is applied to the pixel capacitor needs to be greatly changed between the fields. Since, however, the data line 114 and the pixel capacitor are capacitive loads, the voltage of the pixel capacitor sometimes fails to be changed to a target voltage during the selection time period of the block. In this regard, a predetermined voltage is sometimes applied to the pixel capacitors beforehand in a vertical blanking period, a horizontal blanking period, or the like. This voltage is called a "precharge voltage" and is set to, for example, a gray level. In a drive method wherein the precharge voltage is applied, this precharge voltage acts as the initial voltage Vs, and it may well be employed as the reference data Dref.

Subsequently, similarly to the first averaging circuit 42, the second averaging circuit 52 includes an adder circuit 521 and a latch circuit 522 which perform accumulation every block, a divider circuit 523, and a latch circuit 524. The second averaging circuit 52 averages second difference data Dy for each block, thereby generating second average data Dw2.

Further, the second coefficient circuit 53 includes a multiplier unit, and it multiplies the second average data Dw2 by a second coefficient K2 and outputs the resulting product. The latch circuit 54 is used for time adjustment, and it latches the output data of the second coefficient circuit 53 and outputs the latched data as the second correction data Dh2.

In this manner, in the second correction unit Uh2, the reference data Dref is subtracted from the image data Da of the current block, the subtracted result is integrated in block units, the integrated result is divided by the number of expanded phases (the number of divided channels), and the divided result is multiplied by the second coefficient K2, whereby the second correction data Dh2 is obtained. Accordingly, when K2/6=β is set, the second correction data Dh2 agrees with the second error voltage Ve2 described before. Here, the second coefficient K2 should desirably be determined on the basis of, at least, the parasitic capacitance components due to the respective data lines 114*a*–114*f* and the resistance component of the counter electrode. According to the second correction unit Uh2, in a case, by way of example, where luminance has changed from black to a gray level midway within a certain block, the value of the second correction data Dh2 can be adjusted in accordance with the black area occupied in the pertinent block.

Next, the subtracter circuit 45 subtracts the first correction data Dh1 and the second correction data Dh2 from the image data Db and outputs the resulting difference as the corrected image data Dout. Since the first correction data Dh1 and second correction data Dh2 correspond to the respective error voltages Ve1 and Ve2 as explained before, the subtraction thereof from the image data Db permits the generation of the corrected image data Dout in which reverse block ghost components are contained in the image data Db. Thus, the block ghosting caused by the first and second factors can be cancelled.

The reason why the image data Da before the phase expansion is subjected to correction in this embodiment is as follows. Since the signals after the phase expansion have been divided into the six channels, when deghosting circuits are disposed for the respective channels, the circuit arrangement becomes complicated. In contrast, when the image data Da is subjected to correction, the ghosting can be cancelled by the circuit for one channel. Therefore, according to this embodiment, the ghosting can be effectively cancelled by using a simple construction.

Figure 3:
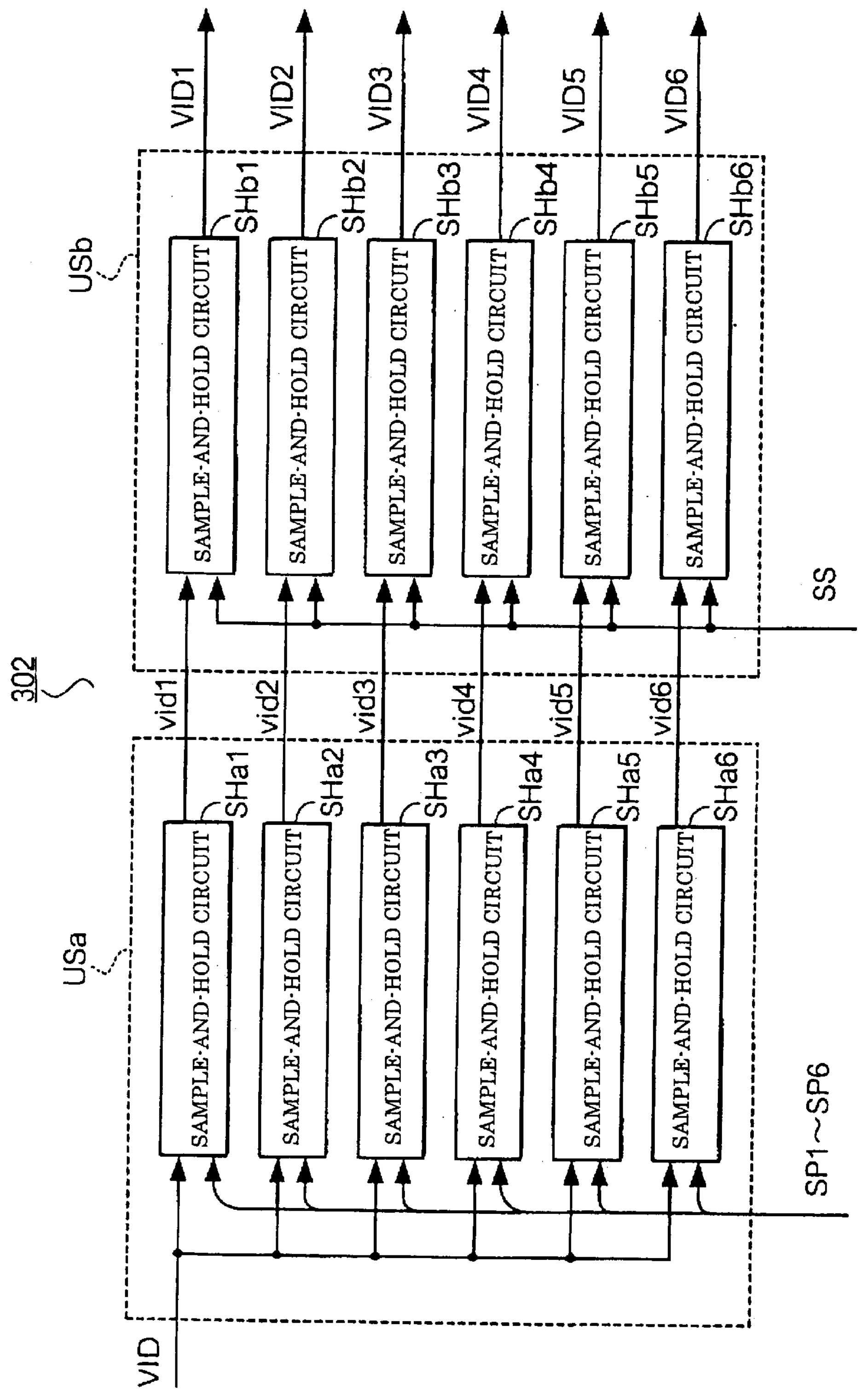
FIG. 3 is a block diagram showing the construction of a phase expansion circuit in the liquid-crystal display device.

Next, the phase expansion circuit 302 will be described. FIG. 3 is a block diagram showing the main construction of the phase expansion circuit 302. As shown in the figure, the phase expansion circuit 302 has a first sample-and-hold unit USa which includes sample-and-hold circuits SHa1–SHa6, and a sample-and-hold unit USb which includes sample-and-hold circuits SHb1–SHb6.

The sample-and-hold circuits SHa1–SHa6 of the first sample-and-hold unit USa sample-and-hold the video signal VID on the basis of the sample-and-hold pulses SP1–SP6 fed from the timing circuit 200, so as to generate signals vid1–vid6, respectively. Here, one period of all the sample-and-hold pulses SP1–SP6 is six times larger than the period of the dot clock signal DCLK, and the phases of the adjacent ones of these pulses are shifted by one period of the dot clock signal DCLK. Accordingly, the time axis of all the signals vid1–vid6 is extended by a factor of six relative to that of the video signal VID, and the phases of the signals vid1–vid6 are successively shifted by a dot clock signal period.

Next, the sample-and-hold circuits SHb1–SHb6 of the second sample-and-hold unit USb sample-and-hold the signals vid1–vid6 on the basis of the sample-and-hold pulse SS fed from the timing circuit 200, so as to output the resulting signals as the phase-expanded video signals VID1–VID6 through corresponding buffer circuits (not shown). The sample-and-hold pulse SS has a period of one unit time. Accordingly, the signals vid1–vid6 are phased at a timing at which the sample-and-hold pulse SS becomes active, so that in-phase phase-expanded video signals VID1–VID6 are generated.

Figure 4:
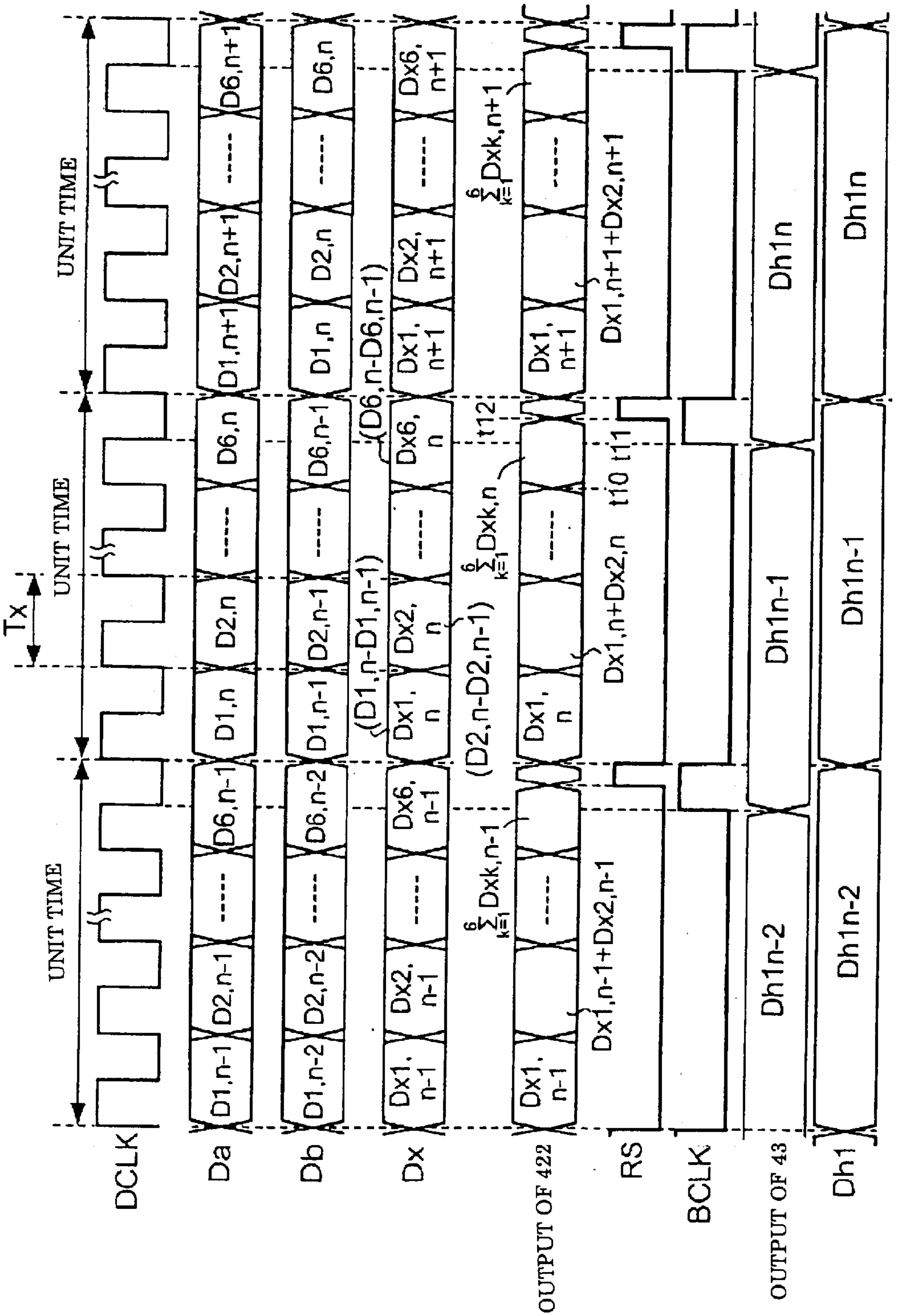
FIG. 4 is a timing chart showing the operation of a first correction unit of the deghosting circuit.

Now, the operation of the liquid-crystal display device will be described. First, the operation from after the input of the image data Da until the corrected image data Dout is generated by the deghosting circuit 304 will be explained. FIG. 4 is a timing chart for explaining the operation of the deghosting circuit 304. In this figure, suffix X in symbol DX,Y denotes the number of the data lines 114 within one block in the scanning direction of the block, while suffix Y denotes the number of blocks. By way of example, data D1,n+1 corresponds to the first data line 114*a* in a block, and the pertinent block is the (n+1)-th block.

The operation of the first correction unit Uh1 will be explained. When the image data Da is fed to the deghosting circuit 304, the delay unit Ud delays the image data Da by one unit time (six dot clock cycles) and outputs the delayed data as the image data Db.

Thus, the image data Db which precedes the image data Da by one unit time is obtained. By way of example, for a time period Tx indicated in FIG. 4, the image data Da is data D2,n, which corresponds to the data line 114*b* of the block Bn. On the other hand, the image data Db is data D2,n−1, which corresponds to the data line 114*b* of the block Bn−1. The data line 114*b* of each of the blocks is fed with the video signal VID2 through the video signal feed line L2. That is, both the image data Da and the image data Db in the pertinent time period Tx correspond to the video signal VID2 which is fed through the video signal feed line L2. Moreover, since the image data Da and the image data Db correspond to adjacent blocks, they are data before and after the signal level of the video signal VID2 is changed over.

When the image data Da and Db are fed to the first subtracter circuit 41, this circuit 41 subtracts the image data Db (previous: one block before) from the image data Da (current), thereby generating the first difference data Dx. By way of example, in the time period Tx indicated in the figure, the image data Da and the image data Db are the data "D2,n" and "D2,n−1", respectively, and hence, the first difference data Dx becomes data "D2,n−D2,n−1".

Figure 14:
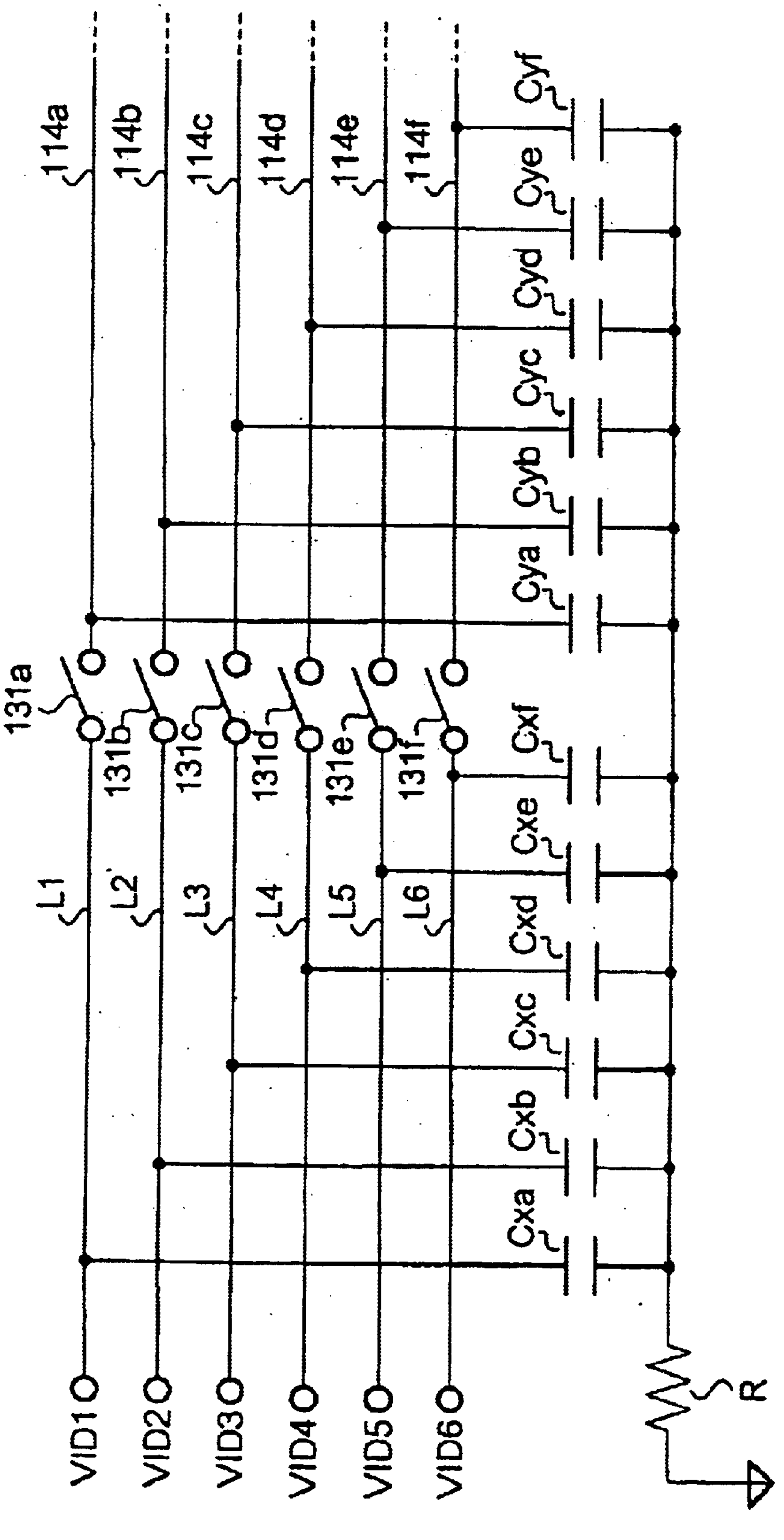
FIG. 14 (RELATED ART)
FIG. 14 is a circuit diagram showing an equivalent circuit in a given block.

As shown in FIG. 14, the video signal feed lines L1–L6 are capacitively coupled. Therefore, when the video signal VID which is applied to any of the video signal feed lines L1–L6 changes, the first error voltage Ve1 is induced in the counter electrode, and the whole pertinent block is affected. Since the whole block is affected by the change of the video signal fed to a certain video signal feed line, the first averaging circuit 42 is used in order to reflect this change in the other video signals.

Since the first difference data Dx are accumulated by the adder circuit 421 and the latch circuit 422 included in the first averaging circuit 42, the output data of the latch circuit 422 corresponding to the last timing within each block becomes the sum of the first difference data Dx accumulated in the pertinent block. By way of example, in a time period from a time t10 to a time t12 indicated in FIG. 4, the output data of the latch circuit 422 becomes Dx1,n+Dx2,n+ . . . +Dx6,n.

The output data of the latch circuit 422 is divided by the divider circuit 423, and the latch circuit 424 latches the divided result on the basis of the block clock signal BCLK. Therefore, the latch circuit 424 generates the first average data Dw1 before the output data of the latch circuit 422 is reset. In the illustrated example, when the block clock signal BCLK rises from a low level to a high level at a time t11, the latch circuit 424 generates the first average data Dw1 in synchronization with the rising edge of the signal BCLK. Thereafter, when the time t12 is reached, the reset signal RS becomes active (high level), and hence, the latch circuit 422 has its output data reset to prepare for the accumulation of the first difference data Dx of the next block.

Further, when the first average data Dw1 is fed to the coefficient circuit 43, it is multiplied by the first coefficient K1. The resulting data, however, is out of phase with the image data Db. Therefore, the latch circuit 44 latches the output data of the coefficient circuit 43 in accordance with the dot clock signal DCLK so as to output the first correction data Dh1 in-phase with the image data Db.

Figure 5:
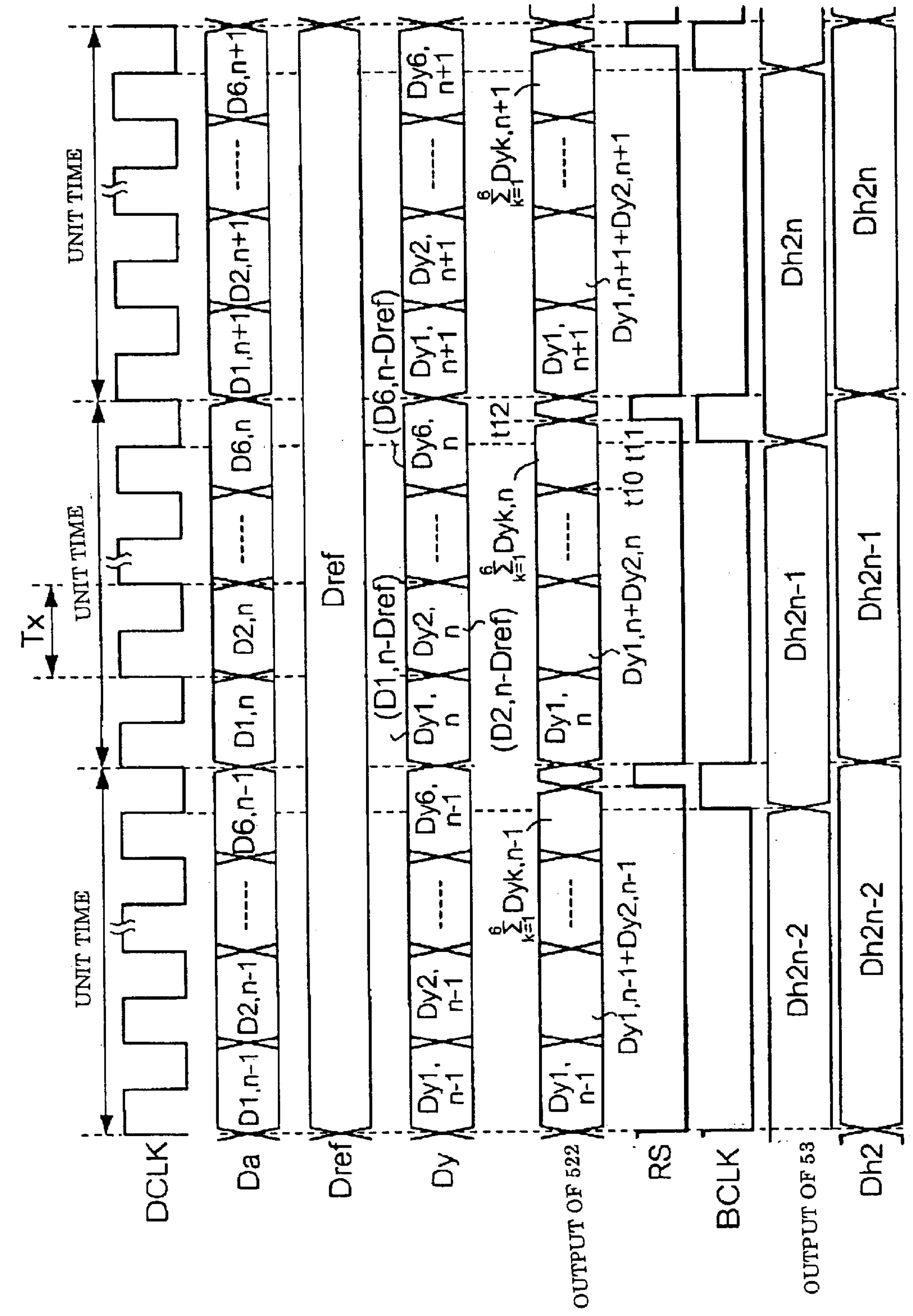
FIG. 5 is a timing chart showing the operation of a second correction unit of the deghosting circuit.

Next, the operation of the second correction unit Uh2 will be explained. FIG. 5 is a timing chart showing the operation of the second correction unit Uh2. When the second subtracter circuit 51 is fed with the image data Da, it subtracts the reference data Dref from the image data Da (current), thereby generating the second difference data Dy. By way of example, in the time period Tx indicated in the figure, the second difference data Dy becomes data "D2,n−Dref".

As shown in FIG. 14, the equivalent capacitances constituted by the parasitic capacitances of the data lines 114*a*–114*f* and the capacitances of the pixel capacitors are capacitively coupled. Therefore, when a voltage which is applied to any of the equivalent capacitances changes, the error voltage Ve2 corresponding to the magnitude of the change is induced in the counter electrode, and the whole pertinent block is affected. Since the whole block is affected by the voltage change of a certain one of the data lines 114*a*–114*f*, the second averaging circuit 52 is used in order to reflect this change in the video signals in advance.

In a similar manner to that of the first averaging circuit 42 averaging the first difference data Dx, the second averaging circuit 52 averages the second difference data Dy every block, thereby generating the second average data Dw2. When the second average data Dw2 is fed to the coefficient circuit 53, it is multiplied by the second coefficient K2. The resulting data, however, is out of phase with the image data Db, as illustrated in the figure. Therefore, the latch circuit 54 latches the output data of the coefficient circuit 53 in accordance with the dot clock signal DCLK so as to output the second correction data Dh2 in-phase with the image data Db.

Further, the first and second correction data Dh1 and Dh2 are subtracted from the image data Db, whereby the corrected image data Dout is generated. The corrected image data Dout is converted into an analog signal through the D/A converter 301, and the analog signal is fed to the phase expansion circuit 302 as the video signal VID.

Figure 6:
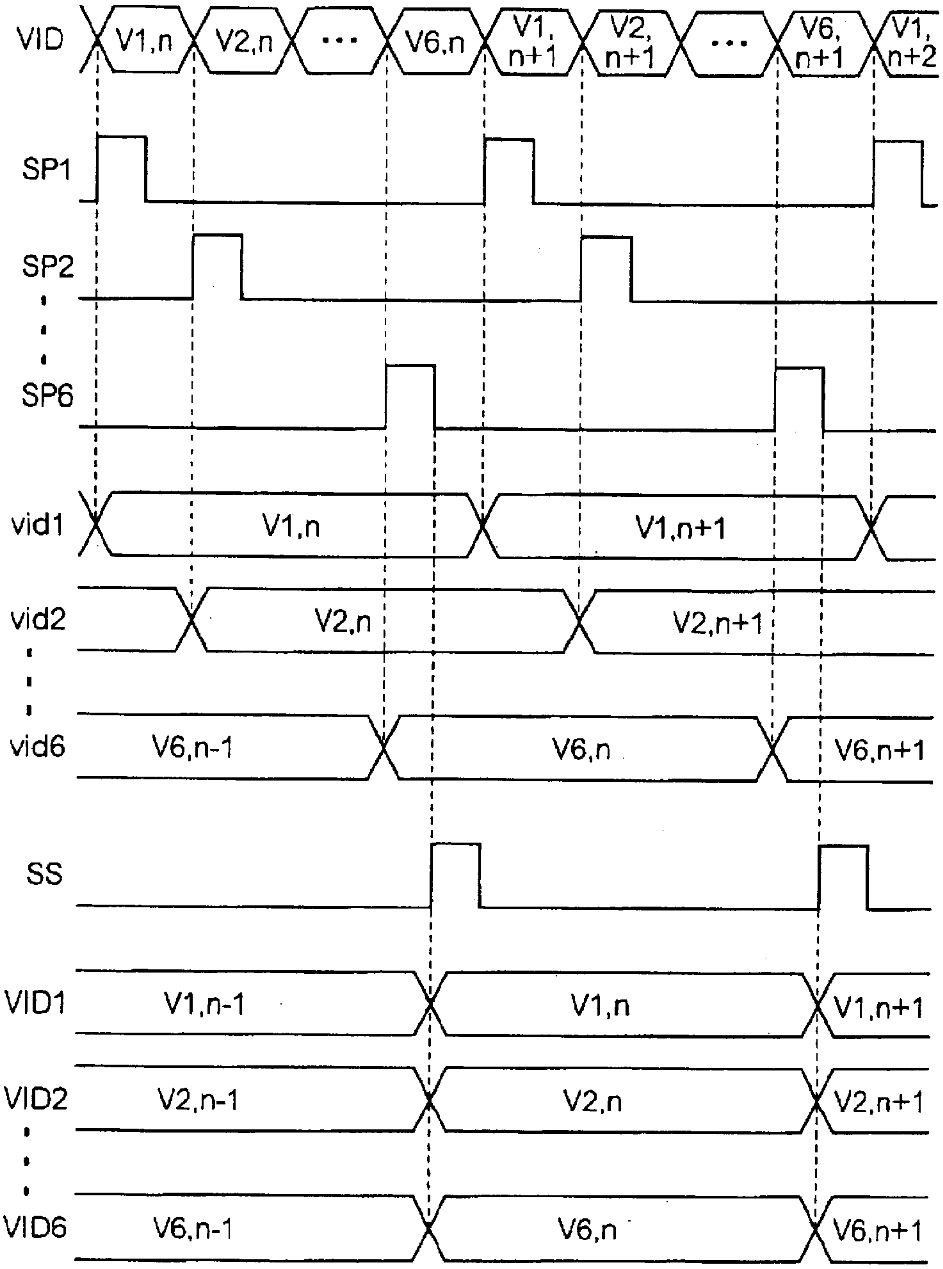
FIG. 6 is a timing chart showing the operation of the phase expansion circuit in the liquid-crystal display device.

Next, the operation in which the phase-expanded video signals VID1–VID6 are generated on the basis of the video signal VID will be explained. FIG. 6 is a timing chart showing the operation of the phase expansion circuit 302.

When the video signal VID is fed to the phase expansion circuit 302, the sample-and-hold circuits SHa1–SHa6 extend the time axis of the video signal VID by a factor of six and divide the extended video signal into six channels in synchronization with the corresponding sample-and-hold pulses SP1–SP6, thereby generating the respective signals vid1–vid6 shown in the figure. Further, the sample-and-hold circuits SHa1–SHa6 sample-and-hold the signals vid1–vid6 in synchronization with the sample-and-hold pulse SS, thereby generating the video signals VID1–VID6, respectively.

Figure 7:
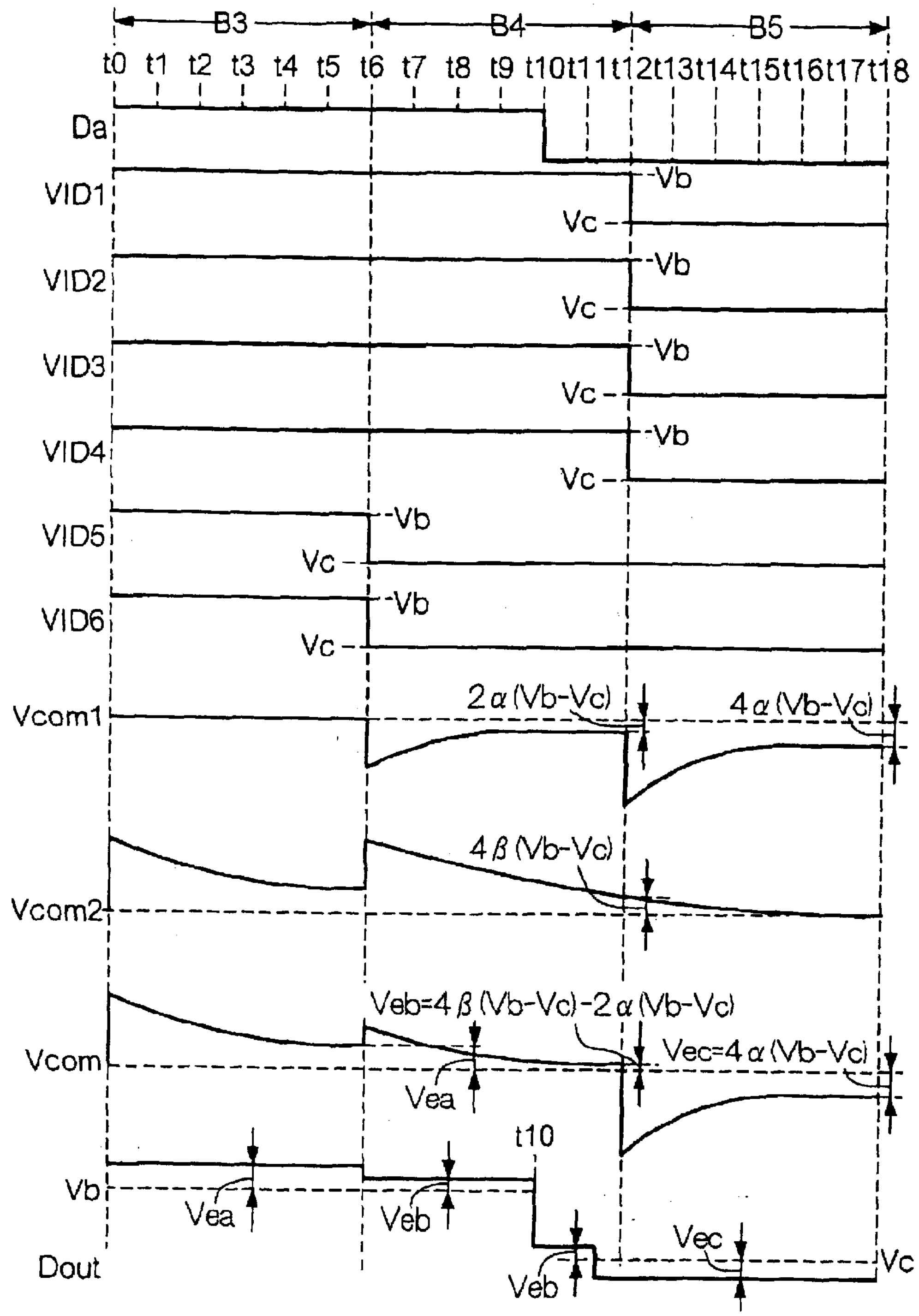
FIG. 7 is a timing chart of phase-expanded video signals in the case of phase-expanding image data without employing the deghosting circuit, and corrected image data generated by employing the deghosting circuit.
Figure 13:
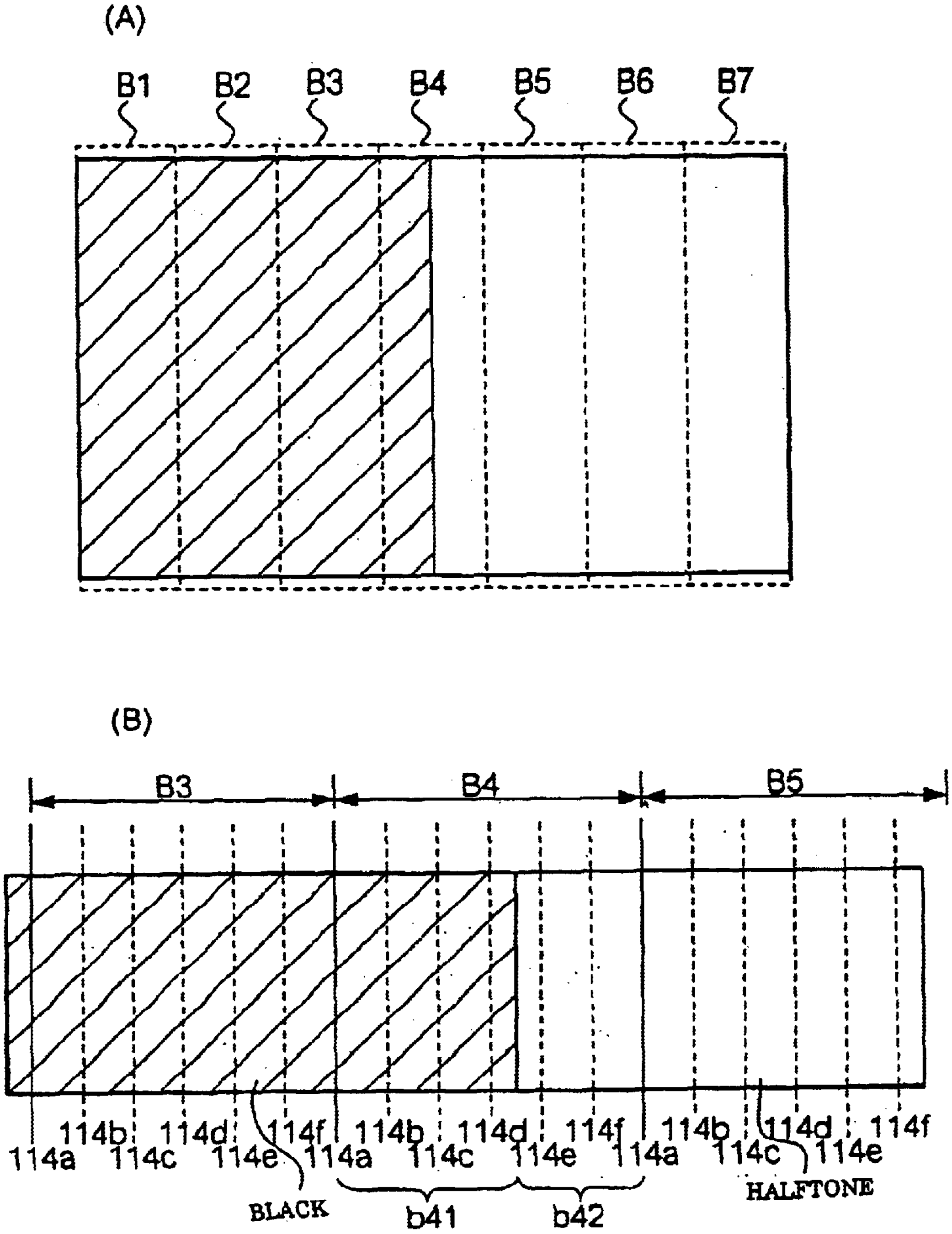
FIG. 13 (RELATED ART)
FIGS. 13A and 13B are explanatory diagrams showing an example of ghosting.

Here, the operation in which the ghost is cancelled will be concretely explained. FIG. 7 is a timing chart of the phase-expanded video signals VID1–VID6 in the case of phase-expanding the video signal VID by feeding the image data Da to the D/A converter 301 without employing the deghosting circuit 304, and the corrected image data Dout generated by employing the deghosting circuit 304. In FIG. 7, in order to facilitate understanding, data values are expressed in terms of the levels of the analog signals, and delay times due to the phase expansion are ignored. In this example, it is assumed that the same display as in FIG. 13A is presented and that the initial voltage Vs is the gray level Vc.

As shown in FIG. 7, the image data Da takes the data value corresponding to the black level Vb for the time period t0–t10, and it takes the data value corresponding to the gray level Vc for the time period t10–t18. Therefore, the phase-expanded video signals VID1–VID4 shift from the level Vb to the level Vc at the time t12 at which the selection time period of the block B4 changes over to that of the block B5. On the other hand, the phase-expanded video signals VID5 and VID6 shift from the level Vb to the level Vc at the time t6 at which the selection time period of the block B3 changes over to that of the block B4.

A voltage Vcom1 which is induced in the counter electrode due to the first factor appears in accordance with the change of each of the phase-expanded video signals VID1–VID6. Accordingly, the waveform of the induced voltage Vcom1 becomes a differential waveform at the time t6 and the time t12, as shown in the figure.

Besides, a voltage Vcom2 which is induced in the counter electrode due to the second factor appears in accordance with the change of each of the phase-expanded video signals VID1–VID6. Accordingly, the waveform of the induced voltage Vcom2 becomes a differential waveform at the time t6 and the time t12, as shown in the figure. The polarity of the induced voltage Vcom2, however, becomes opposite to that of the induced voltage Vcom1.

A voltage Vcom which is actually induced in the counter electrode is given by the total of the induced voltages Vcom1 and Vcom2, and the value of the voltage Vcom at the time at which the selection time period of each block ends becomes the error voltage Ve. Accordingly, the absolute value of the error voltage Ve of the block B4 becomes $4\beta(Vb-Vc)-2\alpha(Vb-Vc)$, while the absolute value of the error voltage Ve of the block B5 becomes $4\alpha(Vb-Vc)$.

In the deghosting circuit 304 according to this embodiment, as explained before, the first correction data Dh1 based on the first factor is generated by the first correction unit Uh1, while the second correction data Dh2 based on the second factor is generated by the second correction unit Uh2. The first and second correction data Dh1 and Dh2 correspond to the error voltages Ve1 and Ve2, respectively.

Here, letting signs Vea, Veb, and Vec denote the differences between the counter electrode voltage Vcom and its center voltage at the times t6, t12, and t18, the corrected image data Dout obtained by the deghosting circuit 304 becomes as shown in FIG. 7. Also in this case, a voltage is induced in the counter electrode in accordance with the change of each of the phase-expanded video signals VID1–VID6 or the proportion of the black level in a certain block. Since, however, the corrected image data Dout has been corrected in consideration of the differences Vea, Veb, and Vec shown in FIG. 7, the induced voltage of the counter electrode can be cancelled. Accordingly, even in the case where the black level changes to a gray level within a block, it is permitted to cancel the block ghosting which appears in the pertinent block and in the following block, and to strongly enhance the quality of the displayed image.

Next, modifications to the foregoing embodiments will be described.

In the foregoing embodiment, the D/A converter 301 is interposed between the deghosting circuit 304 and the phase expansion circuit 302. It is to be understood, however, that it is possible to construct either of the phase expansion circuit 302 and the amplifier/inverter circuit 303 out of a digital circuit, and to dispose the D/A converter 301 on the output side of the digital circuit without departing from the spirit and scope of the present invention.

In the foregoing embodiment, the phase expansion circuit 302 includes the first sample-and-hold unit USa and the second sample-and-hold unit USb shown in FIG. 3, and the signals vid1–vid6 are phased by the second sample-and-hold unit USb. It is also to be understood, however, that it is possible to omit the second sample-and-hold unit USb. In this case, the signals vid1–vid6 whose phases shift every dot clock cycle may be outputted as the phase-expanded video signals VID1–VID6.

Next, examples in which the liquid-crystal display devices explained in the foregoing embodiments are applied to electronic equipment will be described.

Figure 8:
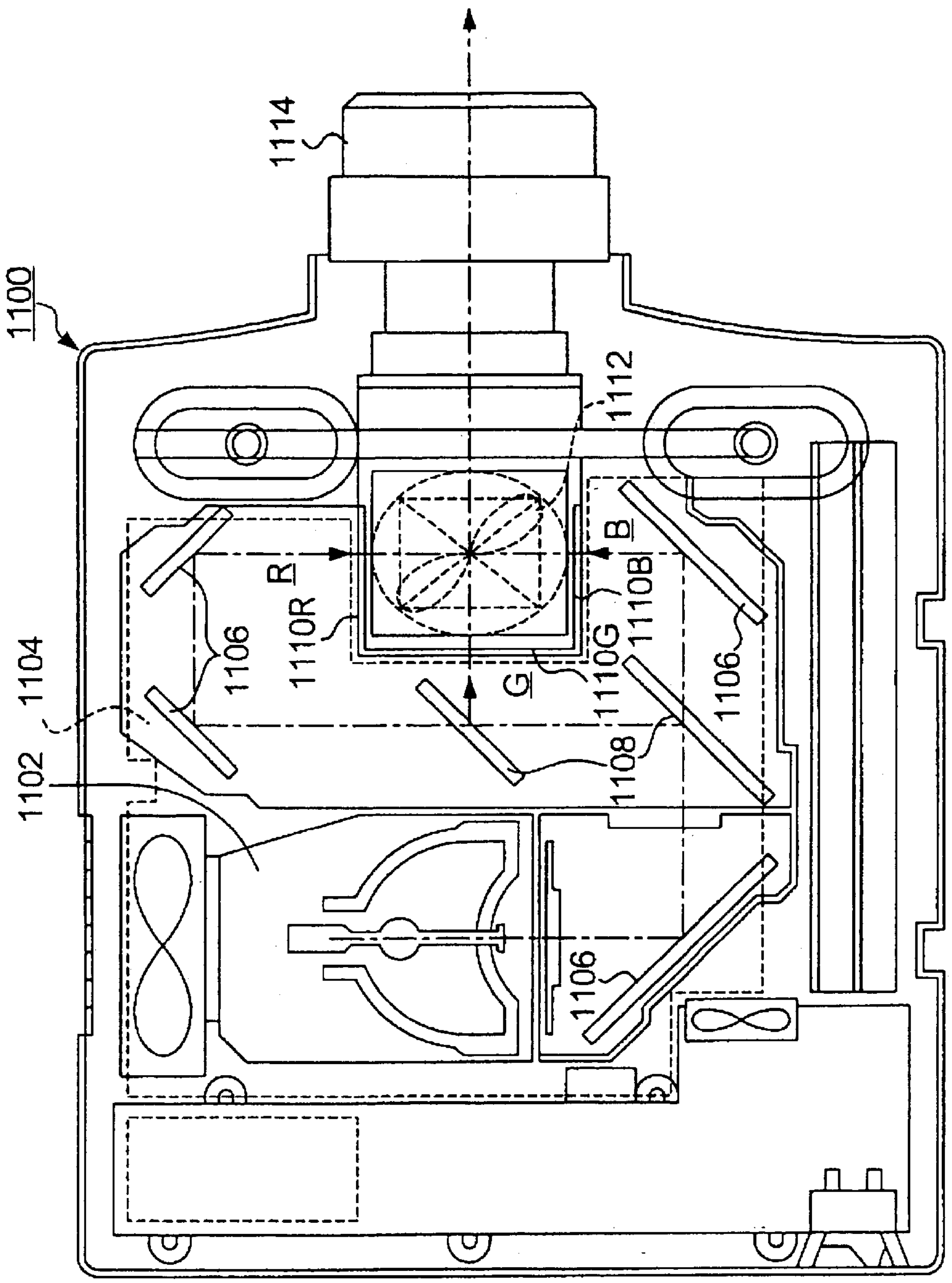
FIG. 8 is a sectional view showing the construction of a projector which is an example of electronic equipment to which the liquid-crystal display device is applied.

A projector which employs the liquid-crystal display device as a light valve will be explained first. FIG. 8 is a plan view showing an example construction of the projector. As shown in the figure, a lamp unit 1102 including a white light source, such as halogen lamp, is disposed inside the projector 1100. Projection light emerging from the lamp unit 1102 is separated into three primary colors R, G and B by four mirrors 1106 and two dichroic mirrors 1108 which are arranged in a light guide 1104. The lights of the three primary colors enter liquid-crystal panels 1110R, 1110B and 1110G which act as light valves for the respective primary colors.

Each of the liquid-crystal panels 1110R, 1110B and 1110G has the same construction as that of the foregoing liquid-crystal display panel 100, and these liquid-crystal panels are respectively driven by primary color signals R, B and G which are supplied by video signal processing circuits (not shown). Further, the light modulated by these liquid-crystal panels enters a dichroic prism 1112 in three directions. In the dichroic prism 1112, the light of the colors R and B is refracted at 90 degrees, whereas the light of the color G is transmitted straight through. The images of the respective colors are accordingly combined, with the result that a color image is projected on a screen or the like through a projection lens 1114.

Incidentally, the light corresponding to the respective primary colors R, G and B enters the liquid-crystal panels 1110R, 1110B and 1110G owing to the dichroic mirrors 1108, so that color filters need not be disposed on the counter substrates.

As explained before, the deghosting circuit 304 or 305 is included in an image processing circuit 300 of the liquid-crystal display device. It is therefore possible to cancel the first or second ghost component and to strongly enhance the quality of the displayed image.

Figure 9:
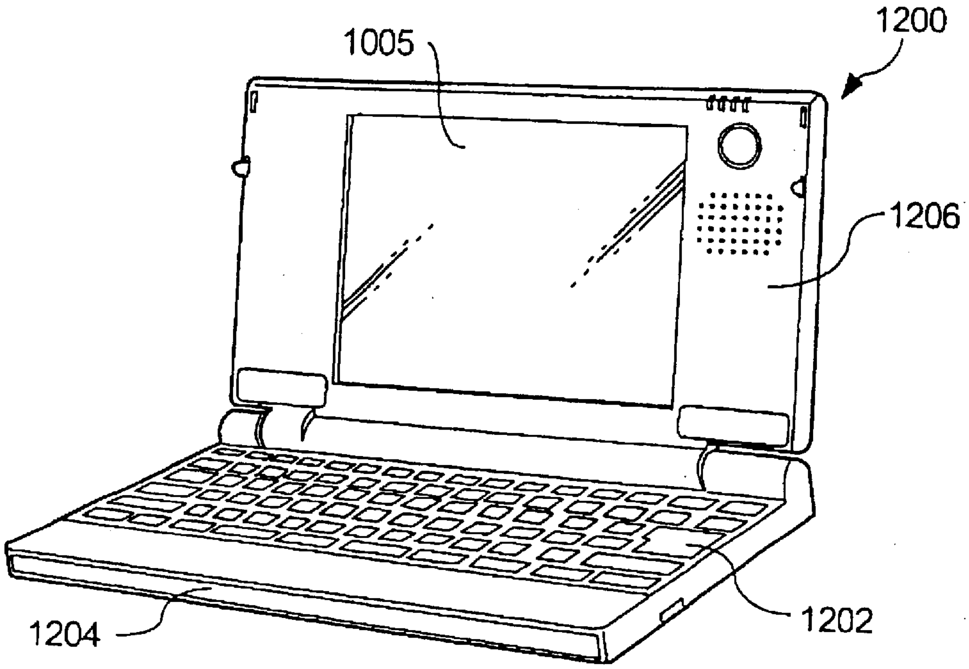
FIG. 9 is a perspective view showing the construction of a personal computer which is an example of electronic equipment to which the liquid-crystal display device is applied.

Next, an example in which the liquid-crystal display device is applied to a portable computer will be explained. FIG. 9 is a front view showing the construction of the computer. Referring to the figure, the computer 1200 is constructed of a body 1204 including a keyboard 1202, and a liquid-crystal display 1206 including a liquid-crystal panel 1005. The liquid-crystal display 1206 is constructed by attaching a back light onto the rear surface of the liquid-crystal panel 100 described above.

Figure 10:
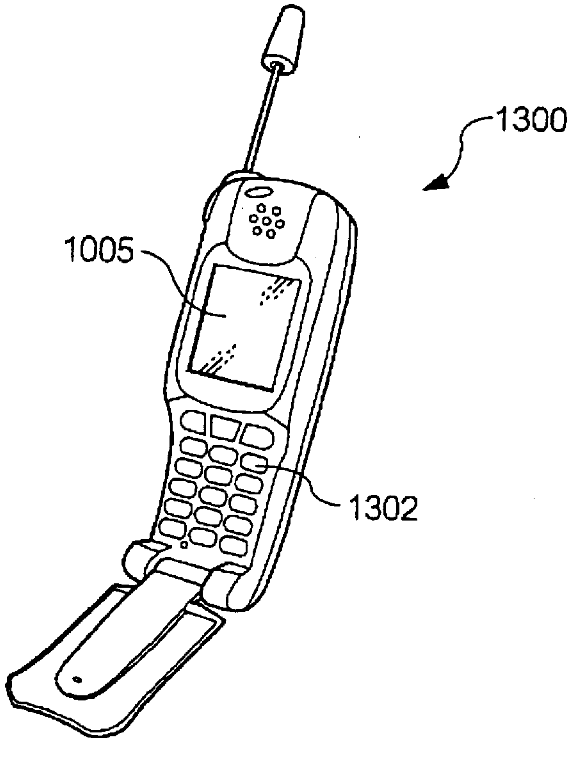
FIG. 10 is a perspective view showing the construction of a portable telephone which is an example of electronic equipment to which the liquid-crystal display device is applied.

Further, an example in which the liquid-crystal display device is applied to a mobile telephone will be explained. FIG. 10 is a perspective view showing the construction of the mobile telephone. Referring to the figure, the mobile telephone 1300 includes a reflection-type liquid-crystal panel 1005 together with a plurality of operating buttons 1302. The reflection-type liquid-crystal panel 1005 is furnished with a front light on its front surface, as required.

Apart from the electronic equipment described with reference to FIGS. 8–10, the present invention can also be used in a liquid-crystal television set, a viewfinder-type or monitor direct-view-type video tape recorder, car navigation equipment, a pager, an electronic notebook, a pocket or desk calculator, a word processor, a workstation, a video telephone, a POS terminal, equipment including a touch panel, and the like.

As thus far described, according to the present invention, in a case where video signals generated by dividing an input video signal into a plurality of channels and extending the time axis thereof, so as to maintain a predetermined signal level every unit time, are fed to corresponding data lines at a predetermined timing, ghosting which appears in a display image is predicted even when a luminance level changes midway in a block, and image data is corrected so as to cancel the ghosting, so that the quality of the display image can be strongly enhanced.

While this invention has been described in conjunction with specific embodiments thereof, it is evident that many alternatives, modifications, and variations will be apparent to those skilled in the art. Accordingly, preferred embodiments of the invention as set forth herein are intended to be illustrative not limiting. Various changes may be made without departing from the spirit and scope of the invention.

What is claimed is:

1. An image processing circuit for use in an electrooptic device having a plurality of scanning lines, a plurality of data lines extending generally perpendicular to the scanning lines, switching elements which are disposed at intersections between the scanning lines and the data lines, and pixel electrodes which are electrically coupled to the corresponding switching elements, comprising:

a delay circuit that delays externally supplied image data by a unit time so as to output delayed image data;

first correction-data generation circuit that generates first correction data on the basis of data which has been obtained by averaging a difference between the image data and the delayed image data every unit time;

second correction-data generation circuit that generates second correction data on the basis of data which has been obtained by averaging a difference between said image data and predetermined reference data every unit time;

correction circuit that generates corrected image data by correcting said delayed image data on the basis of the first correction data and the second correction data; and a phase expansion circuit that divides the corrected image data into a plurality of phase-expanded video signals, and that feeds the phase-expanded video signals to the plurality of data lines.

2. An image processing circuit according to claim 1, wherein said first correction-data generation circuit includes a first subtracter circuit that calculates the difference between said image data and said delayed image data as first difference data, a first averaging circuit that generates first average data obtained by averaging the first difference data every unit time, and a first coefficient circuit that generates said first correction data by multiplying the first average data by a first coefficient.

3. An image processing circuit according to claim 2, wherein said first averaging circuit further includes an accumulator circuit that accumulates said first difference data every unit time, and a divider circuit that divides a result of the accumulation by the number of the video signals divided from the input video signal.

4. An image processing circuit according to claim 1, wherein said second correction-data generation circuit further includes a second subtracter circuit that calculates the difference between said image data and the reference data as second difference data, a second averaging circuit that generates second average data obtained by averaging the second difference data every unit time, and a second coefficient circuit that generates said second correction data by multiplying the second average data by a second coefficient.

5. An image processing circuit according to claim 4, wherein said second averaging circuit further includes an accumulator circuit that accumulates said second difference data every unit time, and a divider circuit that divides a result of the accumulation by the number of the video signals divided from the input video signal.

6. An image processing circuit according to claim 1, wherein the predetermined reference data corresponds to an initial voltage that is applied to pixel capacitors including the pixel electrodes, a counter electrode held opposite to said pixel electrodes, and an electrooptic material.

7. An image processing circuit according to claim 1, wherein the predetermined reference data is a precharge voltage that is applied to pixel capacitors including the pixel electrodes, a counter electrode held opposite to said pixel electrodes, and an electrooptic material.

8. An image processing circuit according to claim 2, further comprising:

a plurality of switching elements that sample the respective phase-expanded video signals in accordance with sampling signals, and that feed the phase-expanded video signals to the corresponding data lines, and video signal feed lines which feed the respective video signals to the corresponding switching elements, wherein the first coefficient of said first coefficient circuit is determined on the basis of at least a parasitic capacitance components due to the respective video signal feed lines and a resistance component of a counter electrode held opposite to the pixel electrodes.

9. An image processing circuit according to claim 4, wherein the second coefficient of said second coefficient circuit is determined on the basis of at least a parasitic capacitance components due to the respective data lines and a resistance component of a counter electrode held opposite to the pixel electrodes.

10. An image processing circuit for use in an electrooptic device, comprising:

a delay circuit that delays externally supplied image data by a unit time so as to output delayed image data;

first correction-data generation circuit that generates first correction data on the basis of data that has been obtained by averaging a difference between the image data and the delayed image data every unit time;

second correction-data generation circuit that generates second correction data on the basis of data which has been obtained by averaging a difference between said image data and predetermined reference data every unit time; and correction circuit that generates corrected image data by correcting said delayed image data on the basis of the first correction data and the second correction data.

11. An electrooptic device, comprising:

a plurality of scanning lines;

a plurality of data lines extending generally perpendicular to the plurality of scanning lines;

switching elements which are disposed at intersections between the scanning lines and the data lines;

pixel electrodes which are respectively electrically coupled to the switching elements;

a delay circuit that delays externally supplied image data by a unit time so as to output delayed image data;

first correction-data generation circuit that generates first correction data on the basis of data which has been obtained by averaging a difference between the image data and the delayed image data every unit time;

second correction-data generation circuit that generates second correction data on the basis of data which has been obtained by averaging a difference between said image data and predetermined reference data every unit time;

correction circuit that generates corrected image data by correcting said delayed image data on the basis of the first correction data and the second correction data; and a phase expansion circuit that divides the corrected image data into a plurality of phase-expanded video signals, and that feeds the phase-expanded video signals to the plurality of data lines.

12. An electrooptic device according to claim 11, further comprising:

a data line driver circuit that generates sampling signals in succession; and a sampling circuit which samples said phase-expanded video signals on the basis of the sampling signals and feeds the sampled signals to the corresponding data lines.

13. An electronic apparatus, comprising the electrooptic device as recited in claim 12.

14. An image data processing method for use in an electrooptic device wherein video signals are fed to a plurality of data lines, comprising the steps of:

generating delayed image data by delaying externally supplied image data by a unit time;

generating a difference between the image data and the delayed image data as first difference data;

generating first average data by averaging the first difference data every unit time;

generating first correction data by multiplying the first average data by a first coefficient;

generating a difference between said image data and predetermined reference data as second difference data;

generating second average data by averaging the second difference data every unit time;

generating second correction data by multiplying the second average data by a second coefficient;

generating corrected image data by correcting said delayed image data on the basis of the first correction data and the second correction data; and dividing the corrected image data into a plurality of phase-expanded video signals, and then feeding said video signals to a plurality of data lines.

15. An image data processing method for use in an electrooptic device, comprising the steps of:

generating delayed image data by delaying externally supplied image data by a unit time;

generating a difference between the image data and the delayed image data as first difference data;

generating first average data by averaging the first difference data every unit time;

generating first correction data by multiplying the first average data by a first coefficient;

generating a difference between said image data and predetermined reference data as second difference data;

generating second average data by averaging the second difference data every unit time;

generating second correction data by multiplying the second average data by a second coefficient; and generating corrected image data by correcting said delayed image data on the basis of the first correction data and the second correction data.

* * * * *

UNITED STATES PATENT AND TRADEMARK OFFICE

CERTIFICATE OF CORRECTION

PATENT NO. : 6,829,392 B2
DATED : December 7, 2004
INVENTOR(S) : Toru Aoki

It is certified that error appears in the above-identified patent and that said Letters Patent is hereby corrected as shown below:

Title page,
Item [54], Title, please change "SYSTEM AND METHOD FOR PROVIDING AN IMAGE DEGOHSTING CIRCUIT IN AN ELECTROPTIC DISPLAY DEVICE" to -- SYSTEM AND METHOD FOR PROVIDING AN IMAGE PROCESSING CIRCUIT THAT IMPROVES IMAGE QUALITY --

Signed and Sealed this

Twenty-eighth Day of June, 2005

JON W. DUDAS
*Director of the United States Patent and Trademark Office*